US012750786B2

(12) United States Patent
Xiao et al.

(10) Patent No.: US 12,750,786 B2
(45) Date of Patent: Sep. 29, 2026

(54) POWER BACKOFF TECHNIQUES FOR MODULATION SCHEMES

(71) Applicant: QUALCOMM Incorporated, San Diego, CA (US)

(72) Inventors: Kexin Xiao, Shanghai (CN); Liangming Wu, Beijing (CN); Changlong Xu, Beijing (CN); Kangqi Liu, San Diego, CA (US); Hao Xu, Beijing (CN); Jian Li, Shanghai (CN); Ruiming Zheng, Beijing (CN); Wei Liu, Beijing (CN)

(73) Assignee: QUALCOMM Incorproated, San Diego, CA (US)

( * ) Notice: Subject to any disclaimer, the term of this patent is extended or adjusted under 35 U.S.C. 154(b) by 263 days.

(21) Appl. No.: 18/264,053

(22) PCT Filed: Mar. 9, 2021

(86) PCT No.: PCT/CN2021/079702

§ 371 (c)(1),
(2) Date: Aug. 2, 2023

(87) PCT Pub. No.: WO2022/188024

PCT Pub. Date: Sep. 15, 2022

(65) Prior Publication Data

US 2024/0137873 A1 Apr. 25, 2024

(51) Int. Cl.
*H04W 52/14* (2009.01)
*H04L 27/34* (2006.01)
(Continued)

(52) U.S. Cl.
CPC ....... *H04W 52/146* (2013.01); *H04L 27/3405* (2013.01); *H04W 52/262* (2013.01); *H04W 52/365* (2013.01)

(58) Field of Classification Search
CPC ............. H04W 52/146; H04W 52/262; H04W 52/365; H04W 52/42; H04L 27/3405
See application file for complete search history.

(56) References Cited

U.S. PATENT DOCUMENTS

2012/0287886 A1 11/2012 Fukuoka et al.
2018/0368081 A1* 12/2018 Akkarakaran ...... H04W 52/365
(Continued)

FOREIGN PATENT DOCUMENTS

CN 108966333 A 12/2018
CN 110959262 A 4/2020

OTHER PUBLICATIONS

"3rd Generation Partnership Project, Technical Specification Group Radio Access Network, Evolved Universal Terrestrial Radio Access (E-UTRA), Physical Layer Procedures (Release 8)", 3GPP TS 36.213, V2.1.0, (Sep. 2007), 3GPP TSG RAN, Sep. 30, 2007 (Sep. 30, 2007), 13 Pages, The Whole Document.
(Continued)

*Primary Examiner* — Ayodeji O Ayotunde
(74) *Attorney, Agent, or Firm* — Holland & Hart LLP

(57) ABSTRACT

Methods, systems, and devices for power backoff techniques for modulation schemes are described. A user equipment (UE) may receive an indication of a constellation distribution parameter and a modulation scheme to be used by the UE for an uplink message on an uplink channel. The UE may determine an uplink transmission power based at least in part on the indicated constellation distribution parameter and the indicated modulation scheme. The UE may transmit the uplink message using the indicated modulation scheme according to the determined uplink transmission power. In some examples, the UE may transmit a report indicating a
(Continued)

power headroom parameter and an output power parameter based at least in part on the constellation distribution parameter.

30 Claims, 15 Drawing Sheets

(51) Int. Cl.
*H04W 52/26* (2009.01)
*H04W 52/36* (2009.01)

(56) References Cited

U.S. PATENT DOCUMENTS

2019/0253219 A1* 8/2019 Fan .......................... H04L 5/001
2021/0282095 A1* 9/2021 Chen ..................... H04W 52/42

OTHER PUBLICATIONS

International Search Report and Written Opinion—PCT/CN2021/079702—ISA/EPO—Dec. 8, 2021.

* cited by examiner

POWER BACKOFF TECHNIQUES FOR MODULATION SCHEMES

CROSS REFERENCE

The present Application is a 371 national stage filing of International PCT Application No. PCT/CN2021/079702 by XIAO et al. entitled "POWER BACKOFF TECHNIQUES FOR MODULATION SCHEMES," filed Mar. 9, 2021, which is assigned to the assignee hereof, and which is expressly incorporated by reference in its entirety herein.

FIELD OF TECHNOLOGY

The following relates to wireless communications, including power backoff techniques for modulation schemes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support power back off techniques for modulation schemes. Generally, the described techniques provide for one or more power parameters associated with a constellation shaping scheme, a modulation scheme, or both (e.g., the parameters may be examples of a power reduction parameter, a supplementary power reduction parameter, or both that correspond to a respective probability distribution parameter). A modulation scheme may include a modulation waveform, a modulation type, or a combination thereof. In some examples, a modulation waveform may be an example of a direct Fourier transform spread orthogonal frequency division multiplexing (DFT-s-OFDM) waveform, a cyclic prefix orthogonal frequency division multiplexing (CP-OFDM) waveform, a generalized frequency division multiplexing (GFDM) waveform, a universal filtered multicarrier (UFMC) waveform, an orthogonal time frequency space (OTFS) waveform, or any combination thereof, among other examples of waveforms. A modulation type may be an example of a quadrature amplitude modulation (QAM) type, a quadrature phase shift keying (QPSK) type, an amplitude phase key shifting (APSK) type, or a combination thereof, among other examples of modulation types. A user equipment (UE) may determine one or more power parameters (e.g., an uplink transmission power for an uplink message) using the one or more power parameters. The UE may communicate in accordance with the one or more power parameters (e.g., the UE may select or adjust a maximum power reduction (MPR) parameter based on a respective probability distribution parameter as part of a power backoff procedure), which may result in a reduced power peak to amplitude ratio (PAPR), an improved signal quality, or both, among other benefits.

A method for wireless communications at a UE is described. The method may include receiving an indication of a constellation distribution parameter and a modulation scheme to be used by the UE for an uplink message on an uplink channel, determining an uplink transmission power based on the indicated constellation distribution parameter and the indicated modulation scheme, and transmitting the uplink message using the indicated modulation scheme according to the determined uplink transmission power.

An apparatus for wireless communications at a UE is described. The apparatus may include a processor, memory coupled with the processor, and instructions stored in the memory. The instructions may be executable by the processor to cause the apparatus to receive an indication of a constellation distribution parameter and a modulation scheme to be used by the UE for an uplink message on an uplink channel, determine an uplink transmission power based on the indicated constellation distribution parameter and the indicated modulation scheme, and transmit the uplink message using the indicated modulation scheme according to the determined uplink transmission power.

Another apparatus for wireless communications at a UE is described. The apparatus may include means for receiving an indication of a constellation distribution parameter and a modulation scheme to be used by the UE for an uplink message on an uplink channel, means for determining an uplink transmission power based on the indicated constellation distribution parameter and the indicated modulation scheme, and means for transmitting the uplink message using the indicated modulation scheme according to the determined uplink transmission power.

A non-transitory computer-readable medium storing code for wireless communications at a UE is described. The code may include instructions executable by a processor to receive an indication of a constellation distribution parameter and a modulation scheme to be used by the UE for an uplink message on an uplink channel, determine an uplink transmission power based on the indicated constellation distribution parameter and the indicated modulation scheme, and transmit the uplink message using the indicated modulation scheme according to the determined uplink transmission power.

In some examples of the method, apparatuses, and non-transitory computer-readable medium described herein, determining the uplink transmission power may include operations, features, means, or instructions for selecting a power reduction parameter based on the constellation distribution parameter and determining an output power parameter based on the power reduction parameter indicated by the constellation distribution parameter, where determining the uplink transmission power may be based on the determined output power parameter.

Some examples of the method, apparatuses, and non-transitory computer-readable medium described herein may further include operations, features, means, or instructions for transmitting a report indicating a power headroom parameter and an output power parameter based on the constellation distribution parameter.

In some examples of the method, apparatuses, and non-transitory computer-readable medium described herein, the indicated modulation scheme includes a modulation type and a modulation waveform and the method, apparatuses, and non-transitory computer-readable medium may include further operations, features, means, or instructions for selecting a power reduction parameter corresponding to the constellation distribution parameter and a combination of the modulation type and the modulation waveform, where determining the uplink transmission power may be based on the selected power reduction parameter.

Some examples of the method, apparatuses, and non-transitory computer-readable medium described herein may further include operations, features, means, or instructions for selecting, for the uplink message, a first power reduction parameter based on the indicated modulation scheme and a second power reduction parameter based on the constellation distribution parameter, where determining the uplink transmission power may be based on the selected first power reduction parameter and the selected second power reduction parameter.

In some examples of the method, apparatuses, and non-transitory computer-readable medium described herein, the indicated modulation scheme includes a modulation type and a modulation waveform and the method, apparatuses, and non-transitory computer-readable medium may include further operations, features, means, or instructions for selecting, for the uplink message, the first power reduction parameter corresponding to the modulation type and the modulation waveform, and the second power reduction parameter corresponding to the constellation distribution parameter, the modulation type, and the modulation waveform, where determining the uplink transmission power may be based on the selected first power reduction parameter and the selected second power reduction parameter.

In some examples of the method, apparatuses, and non-transitory computer-readable medium described herein, the indicated modulation scheme includes a modulation type and a modulation waveform and the method, apparatuses, and non-transitory computer-readable medium may include further operations, features, means, or instructions for selecting, for the uplink message, the first power reduction parameter corresponding to the modulation type and the modulation waveform, and the second power reduction parameter corresponding to the constellation distribution parameter and the modulation waveform, where determining the uplink transmission power may be based on the selected first power reduction parameter and the selected second power reduction parameter.

Some examples of the method, apparatuses, and non-transitory computer-readable medium described herein may further include operations, features, means, or instructions for receiving, from a base station, configuration signaling identifying a probabilistic constellation shaping scheme to be used by the UE to transmit the uplink message, where the constellation distribution parameter may be associated with the probabilistic constellation shaping scheme.

In some examples of the method, apparatuses, and non-transitory computer-readable medium described herein, the probabilistic constellation shaping scheme includes a constant composition distribution matcher or a prefix-free code distribution matcher.

In some examples of the method, apparatuses, and non-transitory computer-readable medium described herein, receiving the indication of the constellation distribution parameter and the modulation scheme may include operations, features, means, or instructions for receiving control signaling including the indication of the constellation distribution parameter and the modulation scheme, the control signaling including a downlink control information message, a radio resource control message, a medium access control (MAC) control element (CE) message, or any combination thereof.

Some examples of the method, apparatuses, and non-transitory computer-readable medium described herein may further include operations, features, means, or instructions for receiving control signaling including the indication of the modulation scheme, identifying an entry of a table preconfigured at the UE that corresponds to the modulation scheme, and determining a value of the constellation distribution parameter from a set of multiple values based on the identified entry.

Some examples of the method, apparatuses, and non-transitory computer-readable medium described herein may further include operations, features, means, or instructions for transmitting, to a base station, control signaling indicating a capability of the UE to determine uplink transmission powers for uplink messages according to constellation distribution parameters, where receiving the indication of the constellation distribution parameter and the modulation scheme may be at least in part in response to the transmitted control signaling.

In some examples of the method, apparatuses, and non-transitory computer-readable medium described herein, the modulation scheme includes a modulation type, a modulation waveform, or a combination thereof.

In some examples of the method, apparatuses, and non-transitory computer-readable medium described herein, the modulation type includes a quadrature amplitude modulation type or a quadrature phase shift keying type and the modulation waveform includes a direct Fourier transform spread orthogonal frequency division multiplexing waveform or a cyclic prefix orthogonal frequency division multiplexing waveform.

A method for wireless communications at a base station is described. The method may include selecting, for a UE, a modulation scheme to be used by the UE for an uplink message to be transmitted on an uplink channel and a constellation distribution parameter associated with the modulation scheme, transmitting, to the UE, an indication of the selected modulation scheme and the selected constellation distribution parameter, and receiving, from the UE, the uplink message on the uplink channel at least in part in response to the transmitted indication.

An apparatus for wireless communications at a base station is described. The apparatus may include a processor, memory coupled with the processor, and instructions stored in the memory. The instructions may be executable by the processor to cause the apparatus to select, for a UE, a modulation scheme to be used by the UE for an uplink message to be transmitted on an uplink channel and a constellation distribution parameter associated with the modulation scheme, transmit, to the UE, an indication of the selected modulation scheme and the selected constellation distribution parameter, and receive, from the UE, the uplink message on the uplink channel at least in part in response to the transmitted indication.

Another apparatus for wireless communications at a base station is described. The apparatus may include means for selecting, for a UE, a modulation scheme to be used by the UE for an uplink message to be transmitted on an uplink channel and a constellation distribution parameter associated with the modulation scheme, means for transmitting, to the UE, an indication of the selected modulation scheme and the selected constellation distribution parameter, and means for receiving, from the UE, the uplink message on the uplink channel at least in part in response to the transmitted indication.

A non-transitory computer-readable medium storing code for wireless communications at a base station is described. The code may include instructions executable by a processor to select, for a UE, a modulation scheme to be used by the UE for an uplink message to be transmitted on an uplink channel and a constellation distribution parameter associated with the modulation scheme, transmit, to the UE, an indication of the selected modulation scheme and the selected constellation distribution parameter, and receive, from the UE, the uplink message on the uplink channel at least in part in response to the transmitted indication.

Some examples of the method, apparatuses, and non-transitory computer-readable medium described herein may further include operations, features, means, or instructions for receiving, from the UE, a report indicating a power headroom parameter and an output power parameter based on the constellation distribution parameter.

Some examples of the method, apparatuses, and non-transitory computer-readable medium described herein may further include operations, features, means, or instructions for transmitting, to the UE, configuration signaling identifying a probabilistic constellation shaping scheme to be used by the UE to transmit the uplink message, where the constellation distribution parameter may be associated with the probabilistic constellation shaping scheme.

In some examples of the method, apparatuses, and non-transitory computer-readable medium described herein, the probabilistic constellation shaping scheme includes a constant composition distribution matcher or a prefix-free code distribution matcher.

In some examples of the method, apparatuses, and non-transitory computer-readable medium described herein, transmitting the indication of the constellation distribution parameter and the modulation scheme may include operations, features, means, or instructions for transmitting control signaling including the indication of the constellation distribution parameter and the modulation scheme, the control signaling including a downlink control information message, a radio resource control message, a medium access control (MAC) control element (CE) message, or any combination thereof.

Some examples of the method, apparatuses, and non-transitory computer-readable medium described herein may further include operations, features, means, or instructions for receiving, from the UE, control signaling indicating a capability of the UE to determine uplink transmission powers for uplink messages according to constellation distribution parameters, where transmitting the indication of the constellation distribution parameter and the modulation scheme may be at least in part in response to the received control signaling.

In some examples of the method, apparatuses, and non-transitory computer-readable medium described herein, the modulation scheme includes a modulation type, a modulation waveform, or a combination thereof and the modulation type includes a quadrature amplitude modulation type or a quadrature phase shift keying type, and the modulation waveform includes a direct Fourier transform spread orthogonal frequency division multiplexing waveform or a cyclic prefix orthogonal frequency division multiplexing waveform.

DETAILED DESCRIPTION

Figure 1:
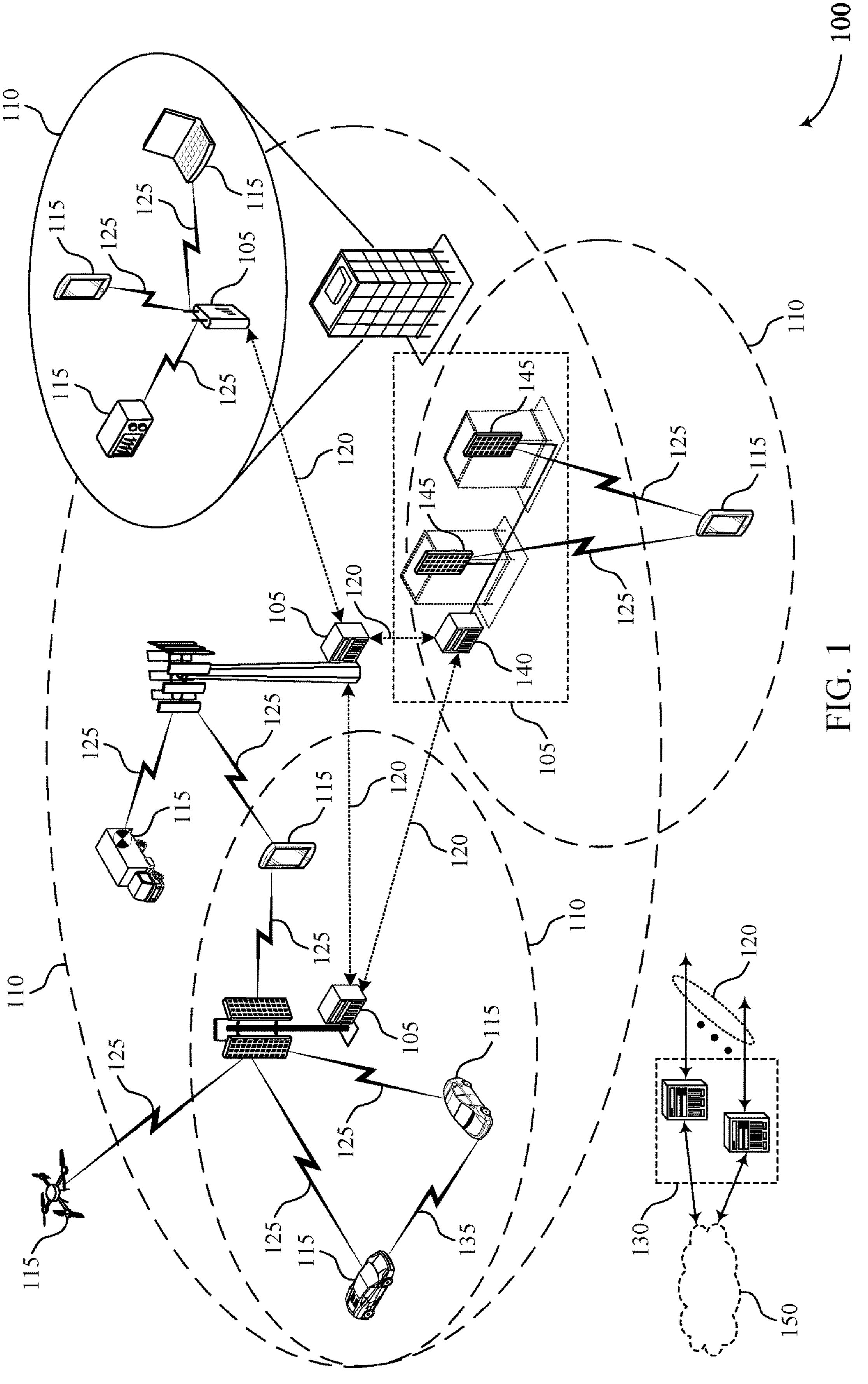
FIG. 1 illustrates an example of a wireless communications system that supports power backoff techniques for modulation schemes in accordance with aspects of the present disclosure.

In some wireless communications systems, devices (e.g., a user equipment (UE) and a base station) may implement orthogonal frequency domain modulation (OFDM) schemes where one or more bits may be encoded in a constellation symbol. In some examples, the devices may employ the use of constellation shaping as part of the signal modulation process. Some techniques for constellation shaping employ a distribution matcher (DM) that applies distribution matching parameters to a bit sequence. As an example, the devices may communicate using a gaussian distribution of constellation symbols, such as geometric constellation shaping or probabilistic constellation shaping (PCS) (e.g., in PCS, a device may generate a non-equal probability of each constellation point of the constellation symbol being selected for associated data).

A UE may be configured to use a power back off procedure to avoid utilizing a non-linear zone of a power amplifier. In some cases, the power back off procedure may fail to account for PCS. For instance, a constant composition distribution matcher (CCDM) or a prefix-free code distribution matcher (PCDM) may be implemented as a PCS scheme, among other examples of PCS schemes. In such cases, the UE may use relatively poor parameter values (e.g., a relatively poor maximum power reduction (MPR) parameter), which may result in the power amplifier operating in a non-linear zone, a relatively high power peak to amplitude ratio (PAPR), poor signal quality, or any combination thereof.

In accordance with the techniques described herein, a UE may implement power backoff procedures that account for a PCS scheme or modulation scheme. For example, the UE may determine one or more power parameters (e.g., a power reduction parameter, an adjustment parameter for the power reduction parameter, or both) that correspond to a PCS scheme or modulation scheme for communications with a base station. In some examples, the base station may transmit an indication of a constellation distribution parameter to the UE. The constellation distribution parameter may be used to control a probability distribution (e.g., the constellation distribution parameter may indicate a probability distribution for a PCS scheme such as CCDM or PCDM). The UE may select or adjust a power parameter (e.g., a power reduction parameter such as an MPR parameter) based on the constellation distribution parameter. In some examples, the UE may select the power parameter based on a correspondence between the power parameter and a respective value of the constellation distribution parameter (e.g., the UE may be configured with a table including a correspondence between a modulation scheme, the constellation distribution parameter, and the power parameter). Additionally or alternatively, the UE may select the power parameter based on a correspondence between the power parameter and a respective modulation scheme. The UE may adjust the selected power parameter by an adjustment parameter (e.g., a supplementary MPR parameter) that corresponds to the constellation distribution parameter. As an example, the UE may use a first table to select an MPR parameter that corresponds to the modulation scheme and a second table to select an adjustment of the MPR parameter that corresponds to a respective constellation distribution parameter. The UE may calculate other parameters using the power parameter. For example, the UE may calculate an uplink transmission power for communications with the base station, a power headroom of the UE, an output power parameter (e.g., a maximum output power that bounds the uplink transmission power), or any combination thereof based on the power reduction parameter.

The techniques described herein may result in one or more potential advantages. For example, by supporting power parameters for power backoff procedures that account for PCS schemes or modulation schemes, a UE may realize a reduced PAPR (e.g., due to avoiding a non-linear zone of a power amplifier of the UE), increased signal quality, or both, among other advantages.

Aspects of the disclosure are initially described in the context of wireless communications systems. Aspects of the disclosure are then described in the context of constellation schemes and process flows. Aspects of the disclosure are further illustrated by and described with reference to apparatus diagrams, system diagrams, and flowcharts that relate to power backoff techniques for modulation schemes.

FIG. 1 illustrates an example of a wireless communications system 100 that supports power backoff techniques for modulation schemes in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some examples, devices of the wireless communications system 100 may implement power backoff procedures based on a PCS scheme or modulation scheme as described herein. For example, a UE 115 may determine one or more power parameters (e.g., a power reduction parameter, an adjustment parameter for the power reduction parameter, or both) that correspond to a PCS scheme or modulation scheme for communications with a base station 105. In some examples, the base station 105 may transmit an indication of a constellation distribution parameter to the UE 115. The constellation distribution parameter may be used to control a probability distribution (e.g., the constellation distribution parameter may indicate a probability distribution for a PCS scheme such as CCDM or PCDM).

The UE 115 may select or adjust a power parameter (e.g., a power reduction parameter such as an MPR parameter) based on the constellation distribution parameter. In some examples, the UE 115 may select the power parameter based on a correspondence between the power parameter and a respective value of the constellation distribution parameter (e.g., the UE 115 may be configured with a table including a correspondence between a modulation scheme, the constellation distribution parameter, and the power parameter). Additionally or alternatively, the UE 115 may select the power parameter based on a correspondence between the power parameter and a respective modulation scheme. The UE 115 may adjust the selected power parameter by an adjustment parameter (e.g., a supplementary MPR parameter) that corresponds to the constellation distribution parameter. As an example, the UE 115 may use a first table to select an MPR parameter that corresponds to the modulation scheme and a second table to select an adjustment of the MPR parameter that corresponds to a respective constellation distribution parameter. The UE 115 may calculate other parameters using the power parameter. For example, the UE 115 may calculate an uplink transmission power for communications with the base station, a power headroom of the UE 115, an output power parameter (e.g., a maximum output power that bounds the uplink transmission power), or any combination thereof based on the power reduction parameter.

Figure 2:
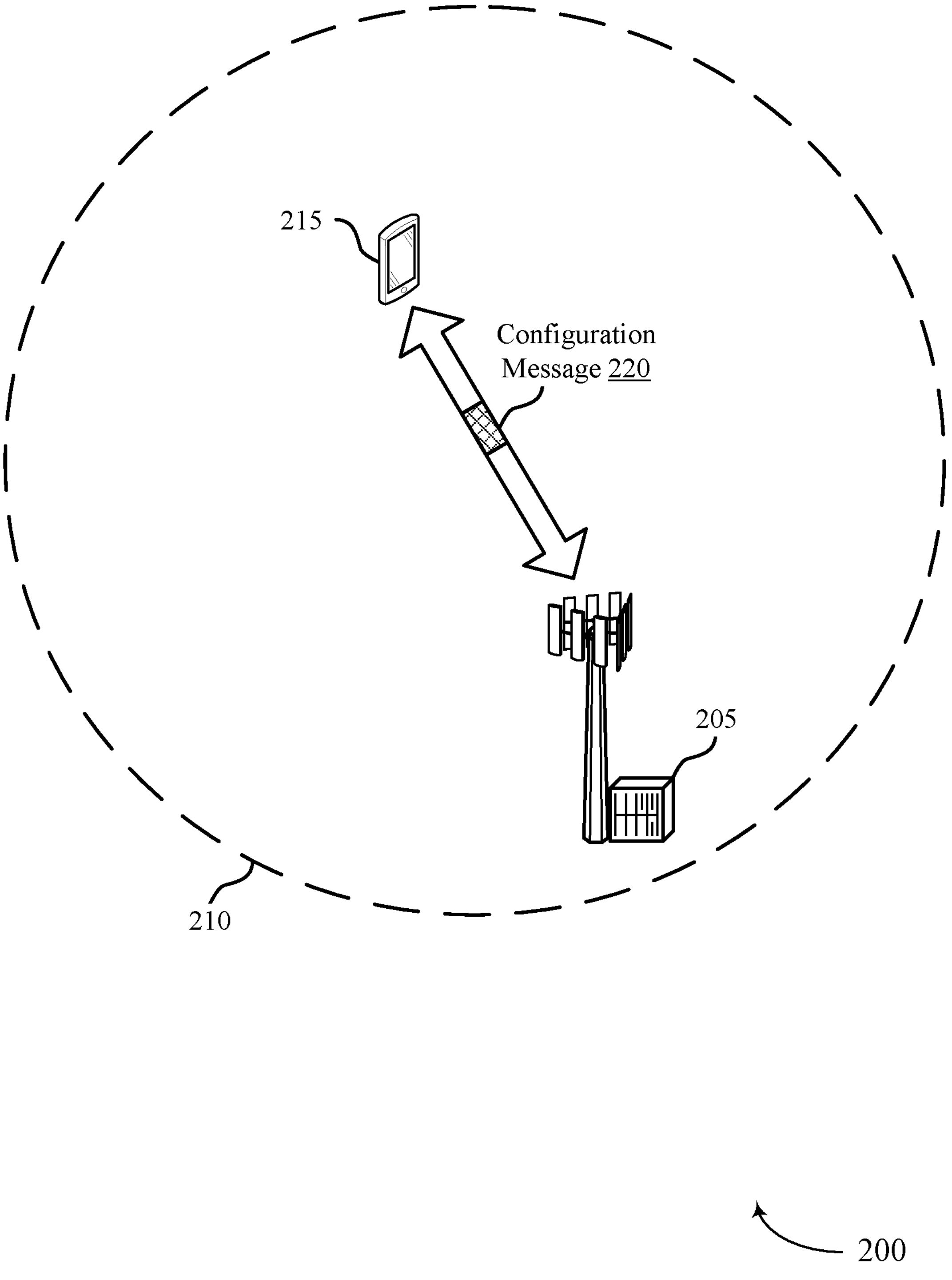
FIG. 2 illustrates an example of a wireless communications system that supports power backoff techniques for modulation schemes in accordance with aspects of the present disclosure.

FIG. 2 illustrates an example of a wireless communications system 200 that supports power backoff techniques for modulation schemes in accordance with aspects of the present disclosure. In some examples, the wireless communications system 200 may implement aspects of wireless communications system 100. For example, the wireless communications system 200 may include a base station 205 and a UE 215, which may be examples of UEs 115 and base stations 105 described herein. Base station 205 may be associated with a coverage area 210, which may be an example of a coverage area 110 as described with reference to FIG. 1.

The UE 215 may be configured for or otherwise considered a transmitting device performing a wireless transmission to the base station 205, which may be configured for or otherwise considered a receiving device. However, it is to be understood that the UE 215 may implement various aspects of the described techniques when acting as or otherwise configured as a receiving device performing a wireless transmission with the base station 205, which would be configured or otherwise acting as a transmitting device.

In some wireless communications systems, wireless devices may encode source information and transmit the encoded information to a destination device. Encoding the source information may improve the reliability with which the destination device may recover the original source information (e.g., through redundancy or other mechanisms), which may improve system reliability. The source information may be represented by a set of source symbols, and based on the operative encoding scheme, an encoder may generate a corresponding set of encoded symbols (which may be transmitted by a transmitting device and received by a receiving device).

Some devices in a wireless network may employ the use of constellation shaping as part of a signal modulation process. To approach the Shannon capacity (e.g., a theoretical maximum amount of information or data capacity that can be sent over a channel or medium), the transmission of quadrature amplitude modulation (QAM) may be non-uniformly distributed. For instance, uniform QAM may be a certain number of dB away from a capacity line asymptotically, which a non-uniformly distributed QAM may be closer in dB to the capacity line. In some examples, Gaussian distribution of constellation symbols may be achieved using two methods. In a first example, a geometric constellation shaping may be achieved using equal probability constellation with Gaussian amplitude distribution. In a second example, a PCS may be achieved using uniform QAM with non-equal probability of constellation, for example as described with reference to FIG. 3, which may improve communications reliability or efficiency.

In some cases, the UE 215 may be configured to use a power back off procedure for uplink transmissions. In some examples, the power back off procedure may fail to account for constellation shaping (e.g., a PCS scheme). For instance, a CCDM or a PCDM) for a PCS scheme may be applied. For example, the constellation distribution parameter may be referred to as ‘v’ and may be used to control the distribution for CCDM, and for PCDM each ‘v’ may be associated with a mapping table where each ‘v’ indicates a probability mass function for a respective constellation set. However, the UE 215 may calculate a power back off using parameters that fail to account for a PCS or modulation scheme (e.g., the UE 215 may use a power for uplink transmissions that operates in a non-linear zone of a power amplifier due to a desired power changing based on the PCS scheme that is not accounted for when calculating the power). For example, the UE 215 may calculate power parameters (e.g., a PUSCH power for an uplink transmission on a PUSCH) using a power reduction parameter based on a modulation scheme. A modulation scheme may include a modulation waveform, a modulation type, or a combination thereof. For example, the modulation waveform may be an example of a direct Fourier transform spread orthogonal frequency division multiplexing (DFT-s-OFDM) waveform, a cyclic prefix orthogonal frequency division multiplexing (CP-OFDM) waveform, a generalized frequency division multiplexing (GFDM) waveform, a universal filtered multicarrier (UFMC) waveform, an orthogonal time frequency space (OTFS) waveform, or any combination thereof, among other examples of waveforms. The modulation type may be an example of a QAM type, a QPSK type, an amplitude phase key shifting (APSK) type, or a combination thereof, among other examples of modulation types. In some examples, the PCS scheme may be combined with geometry shaping (e.g., the devices may use a constellation set with non-uniform geometry distributions).

As an illustrative example, the UE 215 may identify a power reduction parameter (e.g., an MPR parameter) using Table 1.

TABLE 1

| Modulation | | $MPR_{WT}$, $BW_{channel}$ ≤ 200 MHz Inner RB allocations | Edge RB allocations |
|---|---|---|---|
| DFT-s-OFDM | Pi/2 binary phase shift keying (BPSK) | 0.0 | ≤2.0 |
| | QPSK | 0.0 | ≤2.0 |
| | 16 QAM | ≤3.0 | ≤3.5 |
| | 64 QAM | ≤5.0 | ≤5.5 |
| CP-OFDM | QPSK | ≤3.5 | ≤4.0 |
| | 16 QAM | ≤5.0 | ≤5.0 |
| | 64 QAM | ≤7.5 | ≤7.5 |

Although shown as having certain example values, including modulation schemes, and power parameters (e.g., MPR), a different quantity or type of modulation scheme of values of the power parameter values may be used for Table 1. In some examples, the UE 215 may calculate a maximum output power of the UE 215 based on the power reduction parameter (e.g., MPR). As an illustrative example, the UE 215 may calculate an output power parameter (e.g., the maximum output power "$P_{CMAX\_L,f,c}$") using Equation 1:

$$P_{CMAX\_L,f,c} = \mathrm{MIN}\{P_{EMAX,c} - \Delta T_c, (P_{PowerClass} - \Delta P_{PowerClass}) - \mathrm{MAX}(MPR_c + A\text{-}MPR_c + \Delta T_{IB,c} + \Delta T_{C,c} + \Delta T_{RxSRS}, P\text{-}MPR_c)\} \quad (1)$$

In Equation 1, $P_{EMAX,c}$ may be a maximum power that may be signaled by the base station 205, $\Delta T_C$ may be a reduction in the lower limit of maximum power when the signal is near a channel edge, MPR may be a maximum power reduction allowance (e.g., the power reduction parameter), A-$MPR_c$ may be an additional MPR, and P-$MPR_c$ may be a power management MPR. The MPR may be based at least in part on a resource block allocation, a modulation coding scheme, or a combination thereof, as described herein. Although shown as an illustrative example, it is to be understood that Equation 1 may be modified to include different parameters or exclude some parameters, or other methods may be used to determine the output power parameter based on a power reduction parameter.

In some cases, the maximum output power parameter may be the upper bound for an uplink transmission power of the UE 215. As an example, the UE 215 may determine an uplink transmission power (e.g., for an uplink message on a physical uplink shared channel (PUSCH) or a physical uplink control channel (PUCCH)) which may be referred to as "$P_{PUSCH,b,f,c}(i, q_u, q_d, l)$" using Equation 2:

$$P_{PUCCH,b,f,c}(i, q_u, q_d, l) = \min\left\{\begin{array}{l} P_{CMAX,f,c}(i), \\ P_{O\_PUCCH,b,f,c}(q_u) + 10\log_{10}(2^{\mu}\cdot M^{PUCCH}_{RB,b,f,c}(i)) + \\ PL_{b,f,c}(q_d) + \Delta_{F\_PUCCH}(F) + \Delta_{TF,b,f,c}(i) + g_{b,f,c}(i, l) \end{array}\right\} \quad (2)$$

In Equation 2, $P_{CMAX,f,c}(i)$ may refer to a UE-configured maximum output power for the carrier f of the primary cell c in a PUCCH transmission occasion i. $P_{O\_PUCCH,b,f,c}(q_u)$ may refer to an open loop power control parameter associated with an index $q_u$ for a set of open loop power control parameters for the active uplink BWP b of the carrier f of the primary cell c.

$$M^{PUCCH}_{RB,b,f,c}(i)$$

(i) may refer to a bandwidth of a PUCCH resource assignment expressed in number of resource blocks for the PUCCH transmission occasion i on the active uplink BWP b of the carrier f of the primary cell c. $PL_{b,f,c}(q_d)$ may refer to a downlink pathloss estimate calculated by a UE 215 using a reference signal resource index q for an active downlink BWP b of the carrier f of the primary cell c (e.g., using a reference signal for path loss estimation). $\Delta_{F\_PUCCH}$ (F) may refer to an offset value, if provided, or may be omitted (e.g., where $\Delta_{F\_PUCCH}$(F)=0). $\Delta_{TF,b,f,c}(i)$ may refer to a PUCCH transmission power adjustment component on the active uplink BWP b of the carrier f of the primary cell c. $g_{b,f,c}(i, l)$ may refer to a current PUCCH power control adjustment state l for the active uplink BWP b of the carrier f of the serving cell c and PUCCH transmission occasion i.

As part of a power back off procedure, the UE 215 may use values of the output power parameter (e.g., MPR), as shown in Table 1, to bound the upper limit of an uplink transmission power for an uplink transmission (e.g., a PUSCH transmission, a PUCCH transmission, etc.). However, the values of the output power parameter may not account for constellation shaping. For instance, PCS schemes with different probability distributions may be associated with different PAPR performance. For example, the PAPR for a constant CCDM scheme may be greater than the PAPR for a PCDM scheme. In some cases, the PAPR may be relatively large such that the UE 215 may use the non-linear zone of the power amplifier when transmitting information, which may degrade signal quality or create inefficient conditions for communications. Thus, if the power back off procedure fails to account for constellation shaping, the UE 215 may transmit uplink transmissions with poor signal quality.

Accordingly, the UE 215 may implement power backoff procedures that account for a PCS scheme or modulation scheme. For example, the UE 215 may determine one or more power parameters (e.g., a power reduction parameter, an adjustment parameter for the power reduction parameter, or both) that correspond to a PCS scheme or modulation scheme for communications with the base station 205. In some examples, the base station 205 may transmit an indication of a constellation distribution parameter to the UE 215. For example, the base station 205 may transmit a configuration message 220 to the UE 215, where the configuration message 220 may indicate a constellation distribution parameter, a modulation scheme, or both to the UE 215. In some examples, the configuration message 220 may be an example of a control message (e.g., an RRC message, downlink control information (DCI), a MAC control element (CE) message, or the like). In some examples, the base station 205 may transmit the configuration message 220 in response to a capability message (e.g., the UE 215 may transmit a capability message indicating a capability of the UE 215 to the base station 205 and the base station 205 may configure the UE 215 based on the capability).

The constellation distribution parameter may be used to control a probability distribution (e.g., the constellation distribution parameter may indicate a probability distribution for a PCS scheme such as CCDM or PCDM). For example, the constellation distribution parameter may be referred to as a probability distribution controlling parameter 'v' and may be used by the UE 215 to adjust the parameters of a PCS scheme. As one illustrative example, the constellation distribution parameter may correspond to a constellation distribution (e.g., the parameter may control or otherwise affect the distribution for constellation shaping or may be associated with a mapping table for constellation shaping). The modulation scheme may include a modulation waveform (e.g., a DFT-s-OFDM waveform or a CP-OFDM waveform), a modulation type (e.g., 16 QAM, 64 QAM, etc.), or a combination thereof, among other examples of modulation waveforms, modulation types, or geometric shaping types as described herein.

In some cases, the UE 215 may identify one or more power parameters (e.g., power reduction parameters such as an MPR) based on the constellation distribution parameter and the modulation scheme. In some examples, the UE 215 may identify the one or more power parameters from one or more tables configured at the UE 215. In some examples, the base station 205 may configure the one or more tables at the UE 215, for example, via control signaling (e.g., an RRC message, a DCI message, a MAC-CE message, and the like). Additionally or alternatively, the UE 215 may be pre-configured with such tables.

As one example, the UE 215 may determine (e.g., select) the power parameter based on a correspondence between the power parameter and a respective value of the constellation distribution parameter (e.g., the UE may be configured with a table including a correspondence between a modulation scheme, the constellation distribution parameter, and the power parameter). For instance, the UE 215 may determine (e.g., identify) a first power reduction parameter based on the modulation scheme and constellation distribution parameter indicated by the base station 205. As an illustrative example, the UE 215 may be configured with Table 2 and may use Table 2 to determine an MPR for a respective modulation scheme and constellation distribution parameter 'v,' as shown below:

TABLE 2

| | | $MPR_{WT}$, $BW_{channel}$ ≤ 200 MHz | |
|---|---|---|---|
| Modulation | v | Edge RB allocations | Inner RB allocations |
| DFT-s-OFDM Pi/2 BPSK | 0 | | ≤0.21 |
| DFT-s-OFDM QPSK | 0 | | 0 |
| DFT-s-OFDM 16 QAM | 0.01 | | ≤1 |
| DFT-s-OFDM 16 QAM | 0.02 | | ≤2 |
| DFT-s-OFDM 64 QAM | 0.01 | | ≤2.5 |
| DFT-s-OFDM 256 QAM | 0.02 | | ≤4 |
| DFT-s-OFDM 256 QAM | 0.03 | | ≤5 |
| CP-OFDM QPSK | 0 | | ≤1.5 |
| CP-OFDM 16 QAM | 0.01 | | ≤2 |
| CP-OFDM 64 QAM | 0.02 | | ≤3.5 |
| CP-OFDM 256 QAM | 0.03 | | ≤6.5 |

Although shown as having certain example values, including modulation schemes, power parameters (e.g., MPR), and other parameters (e.g., v), it is to be understood that any quantity or type of modulation schemes may be used, or values for the power parameters or other parameters may be used. The UE 215 may determine an MPR for calculating an output power parameter, an uplink transmission power, or both using the Table 2. As an example, for a modulation scheme CP-OFDM 64 QAM and a 'v' value of 0.02, the UE 215 may use an MPR value of less than or equal to 3.5 based on the correspondence between the modulation scheme, 'v,' and the MPR as shown in Table 2. In some cases, the UE 215 may use the MPR that corresponds to the constellation distribution parameter, for example, rather than the MPR of Table 1, which may enable the UE 215 to account for PCS schemes when performing power backoff procedures.

Additionally or alternatively, the UE 215 may determine the one or more power parameters based on multiple tables configured at the UE 215. For example, the UE 215 may select the power parameter based on a correspondence between the power parameter and a respective modulation scheme (e.g., using an MPR value from Table 1). The UE may adjust the selected power parameter by an adjustment parameter (e.g., a supplementary MPR (S-MPR) parameter) that corresponds to the constellation distribution parameter as shown in Table 3:

TABLE 3

| Modulation | v | S-MPR (dB) |
|---|---|---|
| DFT-s-OFDM Pi/2 BPSK | 0 | 0 |
| DFT-s-OFDM QPSK | 0 | 0 |
| DFT-s-OFDM 16 QAM | 0.01 | ≤1 |
| DFT-s-OFDM 16 QAM | 0.02 | |
| DFT-s-OFDM 64 QAM | 0.01 | |
| DFT-s-OFDM 256 QAM | 0.02 | |
| DFT-s-OFDM 256 QAM | 0.03 | |
| CP-OFDM QPSK | 0 | |
| CP-OFDM 16 QAM | 0.01 | |
| CP-OFDM 64 QAM | 0.02 | |
| CP-OFDM 256 QAM | 0.03 | |

As an example, the UE 215 may determine that a modulation scheme is a DFT-S-OFDM QPSK scheme. The UE 215 may combine the MPR value of 2 (or 0 for an inner RB allocation) from Table 1 and the S-MPR value of 0 from Table 3, although any values, parameters, and the like may be used instead. The S-MPR parameter may account for different types of PCS schemes, thereby allowing the UE 215 to account for the PAPR variation brought on by using different PCS schemes when performing power back off procedures.

In some examples, a simplified version of Table 3 may be used. For example, Table 3 may be modified such that a same S-MPR value is used for each modulation waveform as shown in Table 4:

TABLE 4

| Modulation | v | S-MPR (dB) |
| --- | --- | --- |
| DFT-s-OFDM | 0 | 0 |
| | 0 | |
| | 0.01 | |
| | 0.02 | |
| | 0.01 | |
| | 0.02 | |
| | 0.03 | |
| CP-OFDM | 0 | 0 |
| | 0.01 | |
| | 0.02 | |
| | 0.03 | |

In the example where the UE 215 is configured with Table 4, S-MPR values for a respective modulation waveform may be applied to each modulation type of the modulation waveform. For instance, if the UE 215 and the base station 205 communicate using DFT-s-OFDM waveforms, regardless of the modulation type, the UE 215 may use the same S-MPR value associated with DFT-s-OFDM waveforms. Likewise, if the UE 215 and the base station 205 communicate using CP-OFDM waveforms, regardless of the modulation type, the UE 215 may use the same S-MPR value associated with CP-OFDM waveforms. In some cases, Table 4 may result in a reduced signaling overhead for indicating the modulation scheme or other parameters.

The UE 215 may use the one or more determined power parameters to calculate other power parameters for power backoff procedures as described herein. For example, the UE 215 may use the MPR value from Table 2 or an adjusted MPR value from adjusting a first MPR value of Table 1 by the S-MPR value of Tables 3 or 4. The UE 215 may use such MPRs to calculate an output power parameter (e.g., as described with reference to Equation 1) and the UE 215 may calculate an uplink transmission power (e.g., as described with reference to Equation 2) using the power reduction parameter. In some examples, the uplink transmission power may correspond to a power for communications with the base station 205 (e.g., uplink communications via a PUSCH or PUCCH or sidelink communications with other UEs, among other examples of communications to a receiving device from the UE 215). In some examples, such techniques may result in a maximum transmit power that is based on a probability distribution and/or a modulation scheme (e.g., modulation types), which may improve power backoff accuracy and efficiency.

In some examples, the UE 215 may transmit a report to the base station 205. For example, the UE 215 may transmit a power headroom report to the base station 205 indicating a power headroom and an output power parameter (e.g., a maximum output power) determined using the modulation scheme and/or the constellation distribution parameter. Such a report may be transmitted via a power headroom report MAC-CE.

Figure 3:
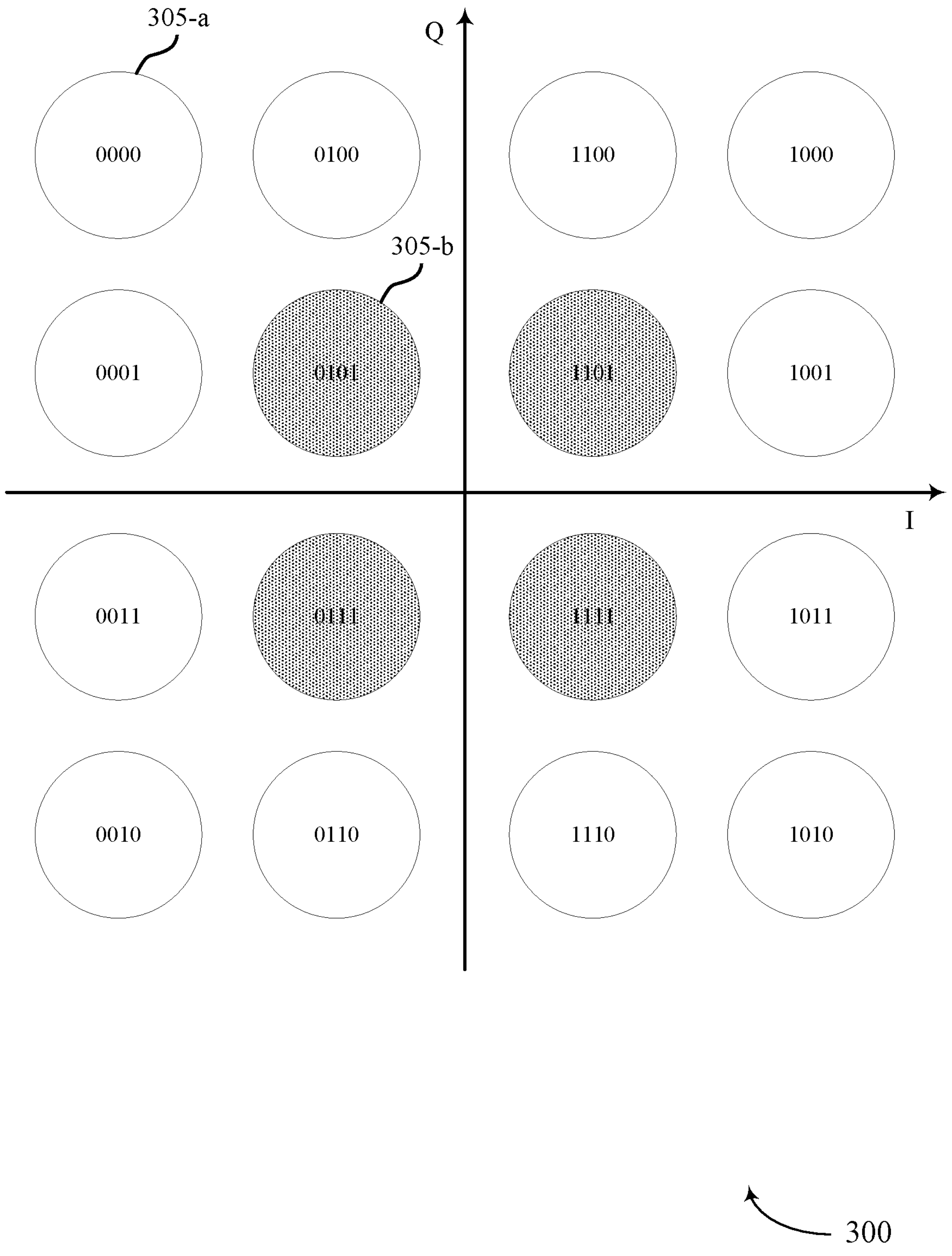
FIG. 3 illustrates an example of a constellation scheme that supports power backoff techniques for modulation schemes in accordance with aspects of the present disclosure.

FIG. 3 illustrates an example of a constellation 300 that supports power backoff techniques for modulation schemes in accordance with aspects of the present disclosure. In some examples, the constellation 300 may implement aspects of the wireless communications system 100 or 200. Aspects of the constellation 300 may be implemented by a transmitting device and/or a receiving device, which may be examples of a UE and/or a base station as described herein. In some examples, the constellation 300 may illustrate constellation points 305 on an x axis (e.g., an I wave axis representing an in-phase or sine wave) and a y axis (e.g., a Q wave axis representing a quadrature or cosine wave).

The constellation 300 may generally illustrate an example of a 16 QAM scheme that is shaped by probability as described herein with reference to FIG. 2. For example, each point 305 of the constellation 300 may represent a quantity of bits (e.g., the upper left point 305-*a* may represent a value of 0000, although any value may be placed in any order or at any point). As shown for illustrative example, the middle of the QAM constellation may have an increased probability (e.g., the constellation 300 may be a non-uniform probability distribution QAM constellation). For example, the chances that bits may be encoded to correspond to the central points of the constellation 300, such as the point 305-*b* or other shaded points located relatively closer to the center of the constellation 300, may be relatively higher than the probability that the bits may be encoded to the outer points such as the point 305-*a* located relatively further from the center of the constellation 300.

As described herein with reference to FIG. 2, in some cases power backoff techniques may fail to account for PCS such as the constellation 300. For instance, the constellation 300 may be used with a PCDM or CCDM scheme, among other examples of PCS schemes. In such cases, a transmitting device may use relatively poor parameter values for power backoff procedures (e.g., a relatively poor maximum power reduction (MPR) parameter), which may result in the power amplifier operating in a non-linear zone, a relatively high power peak to amplitude ratio (PAPR), poor signal quality, or any combination thereof.

In accordance with the techniques described herein, the transmitting device may implement power backoff procedures that account for a PCS scheme or modulation scheme. For example, the transmitting device may determine one or more power parameters (e.g., a power reduction parameter, an adjustment parameter for the power reduction parameter, or both) that correspond to a PCS scheme or modulation scheme for communications with a base station. In some examples, the receiving device may transmit an indication of a constellation distribution parameter to the transmitting device. The constellation distribution parameter may be used to control a probability distribution (e.g., the constellation distribution parameter may indicate a probability distribution for a PCS scheme such as CCDM or PCDM).

The transmitting device may select or adjust a power parameter (e.g., a power reduction parameter such as an MPR parameter) based on the constellation distribution parameter. In some examples, the transmitting device may select the power parameter based on a correspondence between the power parameter and a respective value of the constellation distribution parameter (e.g., the transmitting device may be configured with a table including a correspondence between a modulation scheme, the constellation distribution parameter, and the power parameter). Additionally or alternatively, the transmitting device may select the power parameter based on a correspondence between the power parameter and a respective modulation scheme. The transmitting device may adjust the selected power parameter by an adjustment parameter (e.g., a supplementary MPR parameter) that corresponds to the constellation distribution parameter. As an example, the transmitting device may use a first table to select an MPR parameter that corresponds to the modulation scheme and a second table to select an adjustment of the MPR parameter that corresponds to a respective constellation distribution parameter. The transmitting device may calculate other parameters using the power parameter. For example, the transmitting device may calculate an uplink transmission power for communications with the base station, a power headroom of the transmitting device, an output power parameter (e.g., a maximum output power that bounds the uplink transmission power), or any combination thereof based on the power reduction parameter.

Figure 4:
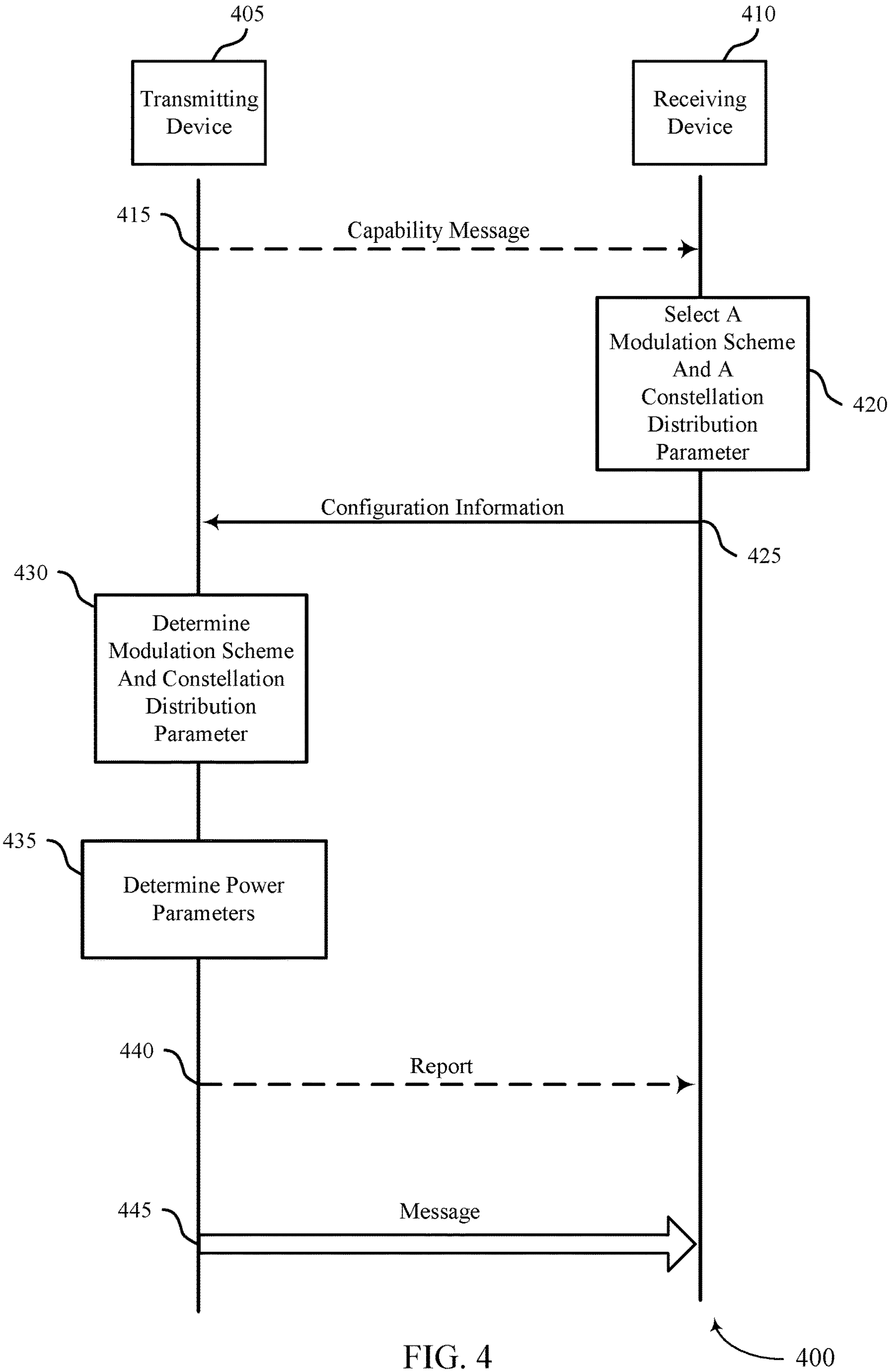
FIG. 4 illustrates an example of a process flow that supports power backoff techniques for modulation schemes in accordance with aspects of the present disclosure.

FIG. 4 illustrates an example of a process flow 400 that supports power backoff techniques for modulation schemes in accordance with aspects of the present disclosure. In some examples, the process flow 400 may implement aspects of wireless communications systems 100 or 200. The process flow 400 includes a transmitting device 405 and a receiving device 410, which may be examples of the corresponding devices described with reference to FIG. 1 through 3. Process flow 400 may be implemented by a transmitting device 405 (such as a base station 105 or a UE 115) and a receiving device 410 (such as a base station 105 or a UE 115). Alternative examples of the following may be implemented, where some steps are performed in a different order than described or are not performed at all. In some cases, steps may include additional features not mentioned below, or further steps may be added.

In some examples, at 415 the transmitting device 405 may send a capability message to the receiving device 410. For example, the transmitting device 405 may indicate a capability of the transmitting device 405 (e.g., a capability of using one or more modulation schemes or PCS schemes) to the receiving device 410 as described with reference to FIG. 2.

At 420, the receiving device 410 may select a modulation scheme and a constellation distribution parameter. For example, the receiving device 410 may determine a modulation scheme, a constellation distribution parameter, or both for communications with the transmitting device 405 as described with reference to FIG. 2. In some cases, the receiving device 410 may select the modulation scheme in response to the capability message.

At 425, the receiving device 410 may send configuration information to the transmitting device 405. For example, the receiving device 410 may transmit control signaling configuring the transmitting device with various parameters, tables, or schemes as described herein with reference to FIG. 2.

At 430, the transmitting device 405 may determine a modulation scheme and constellation distribution parameter. For example, the transmitting device 405 may determine the modulation scheme and constellation distribution parameter based on the configuration information. At 435, the transmitting device 405 may determine one or more power parameters for a power backoff procedure as described herein with reference to FIG. 2. For example, the transmitting device 405 may determine an MPR based on the modulation scheme and constellation distribution parameter and calculate a transmission power, an output power parameter, or both using the MPR.

In some examples, at 440 the transmitting device 405 may transmit a report to the receiving device 410. For example, the transmitting device 405 may transmit a power headroom report to the receiving device 410 as described herein. At 445, the transmitting device 405 may transmit a message using the calculated transmission power. For example, the transmitting device 405 may transmit an uplink message using a calculated uplink transmission power as described herein with reference to FIG. 2, although other communications are possible (e.g., a sidelink message using a sidelink transmission power).

Figure 5:
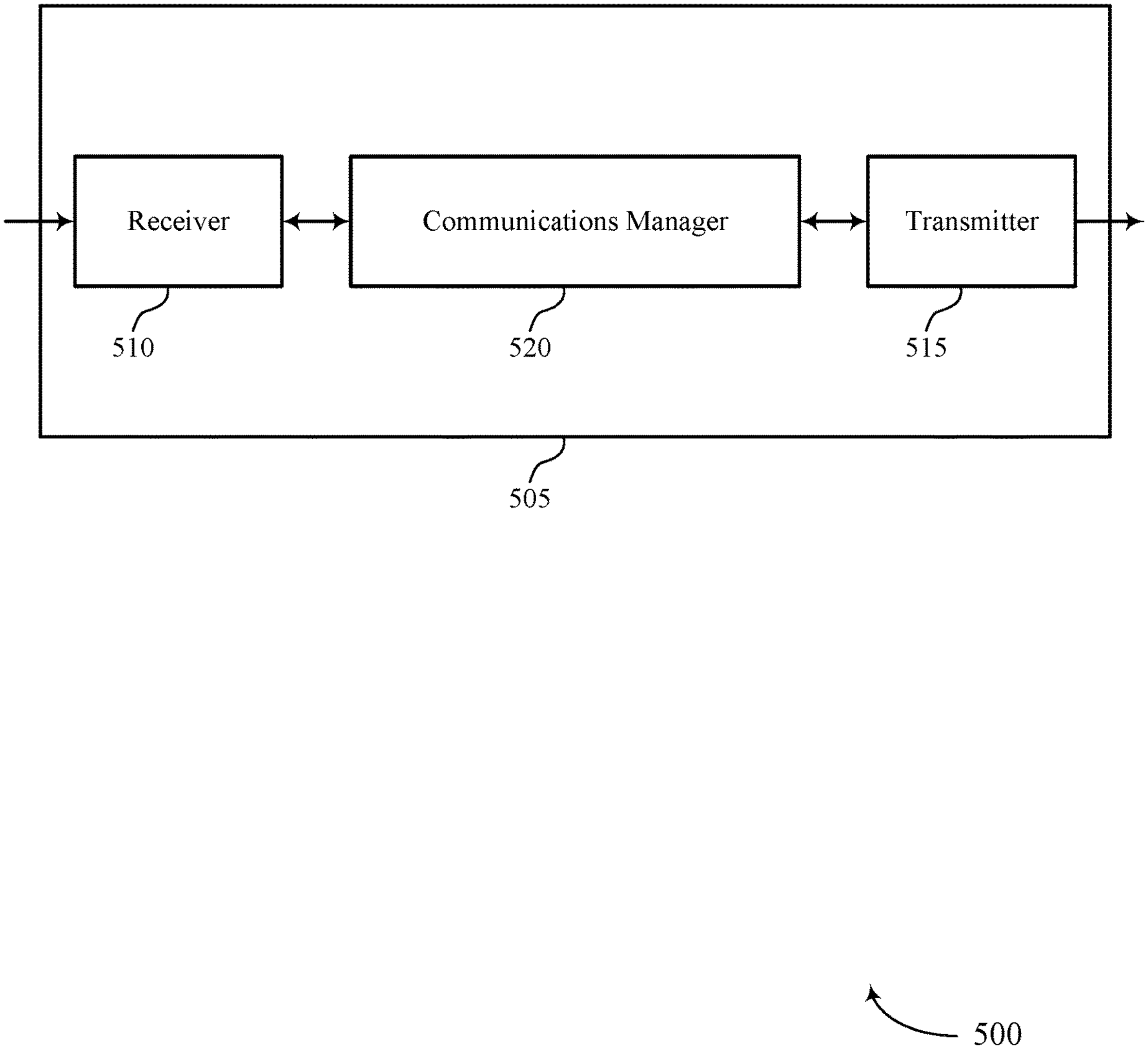
FIGS. 5 and 6 show block diagrams of devices that support power backoff techniques for modulation schemes in accordance with aspects of the present disclosure.

FIG. 5 shows a block diagram 500 of a device 505 that supports power backoff techniques for modulation schemes in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to power backoff techniques for modulation schemes). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to power backoff techniques for modulation schemes). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of power backoff techniques for modulation schemes as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving an indication of a constellation distribution parameter and a modulation scheme to be used by the UE for an uplink message on an uplink channel. The communications manager 520 may be configured as or otherwise support a means for determining an uplink transmission power based on the indicated constellation distribution parameter and the indicated modulation scheme. The communications manager 520 may be configured as or otherwise support a means for transmitting the uplink message using the indicated modulation scheme according to the determined uplink transmission power.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for power backoff based on modulation schemes. For example, the device 505 may determine power parameters (e.g., power reduction parameters) based on a modulation scheme or PCS scheme as described herein, which may result in power savings, improved signal quality, or both at the device 505, among other advantages.

Figure 6:
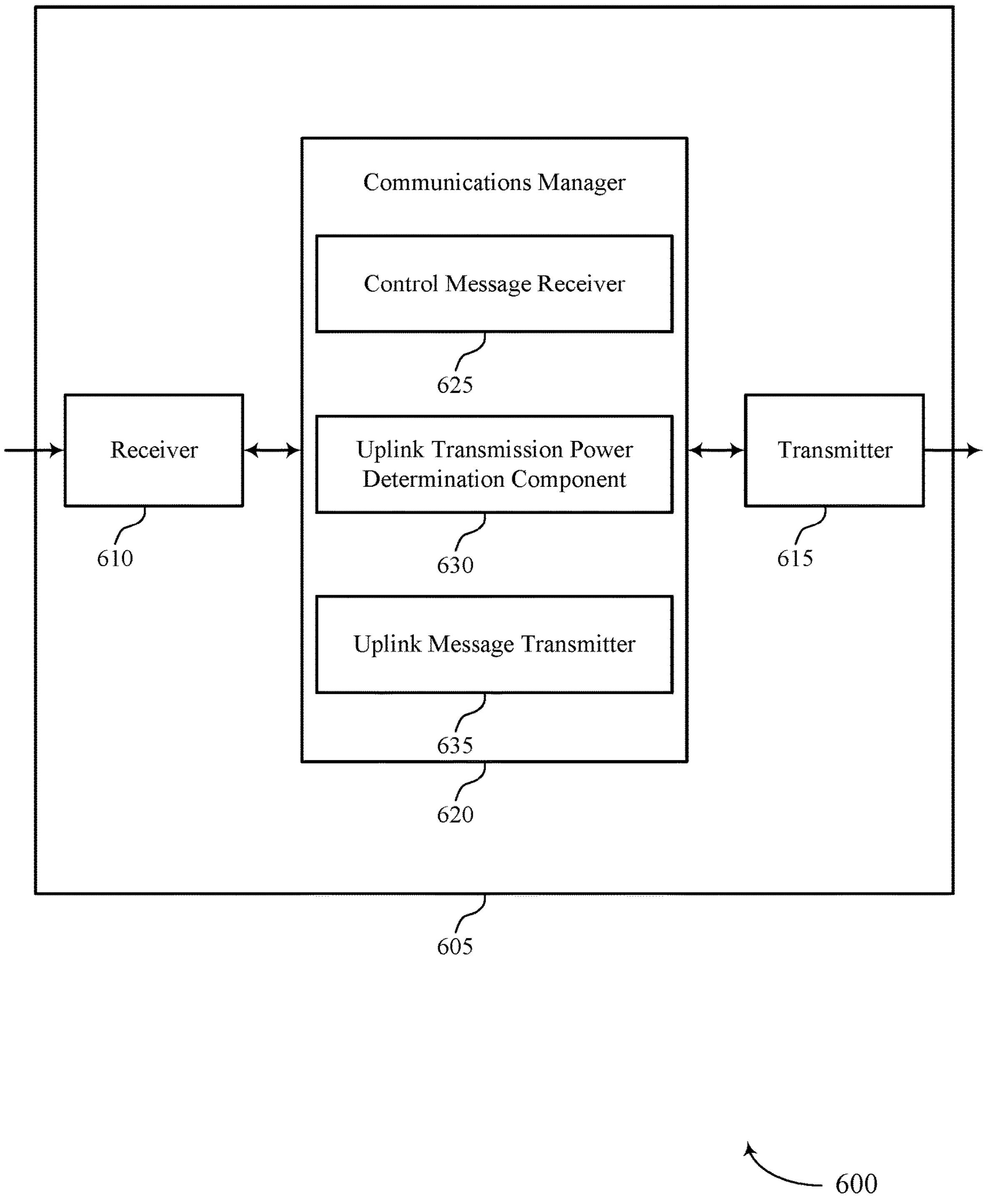

FIG. 6 shows a block diagram 600 of a device 605 that supports power backoff techniques for modulation schemes in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to power backoff techniques for modulation schemes). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to power backoff techniques for modulation schemes). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of power backoff techniques for modulation schemes as described herein. For example, the communications manager 620 may include a control message receiver 625, an uplink transmission power component 630, an uplink message transmitter 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The control message receiver 625 may be configured as or otherwise support a means for receiving an indication of a constellation distribution parameter and a modulation scheme to be used by the UE for an uplink message on an uplink channel. The uplink transmission power component 630 may be configured as or otherwise support a means for determining an uplink transmission power based on the indicated constellation distribution parameter and the indicated modulation scheme. The uplink message transmitter 635 may be configured as or otherwise support a means for transmitting the uplink message using the indicated modulation scheme according to the determined uplink transmission power.

Figure 7:
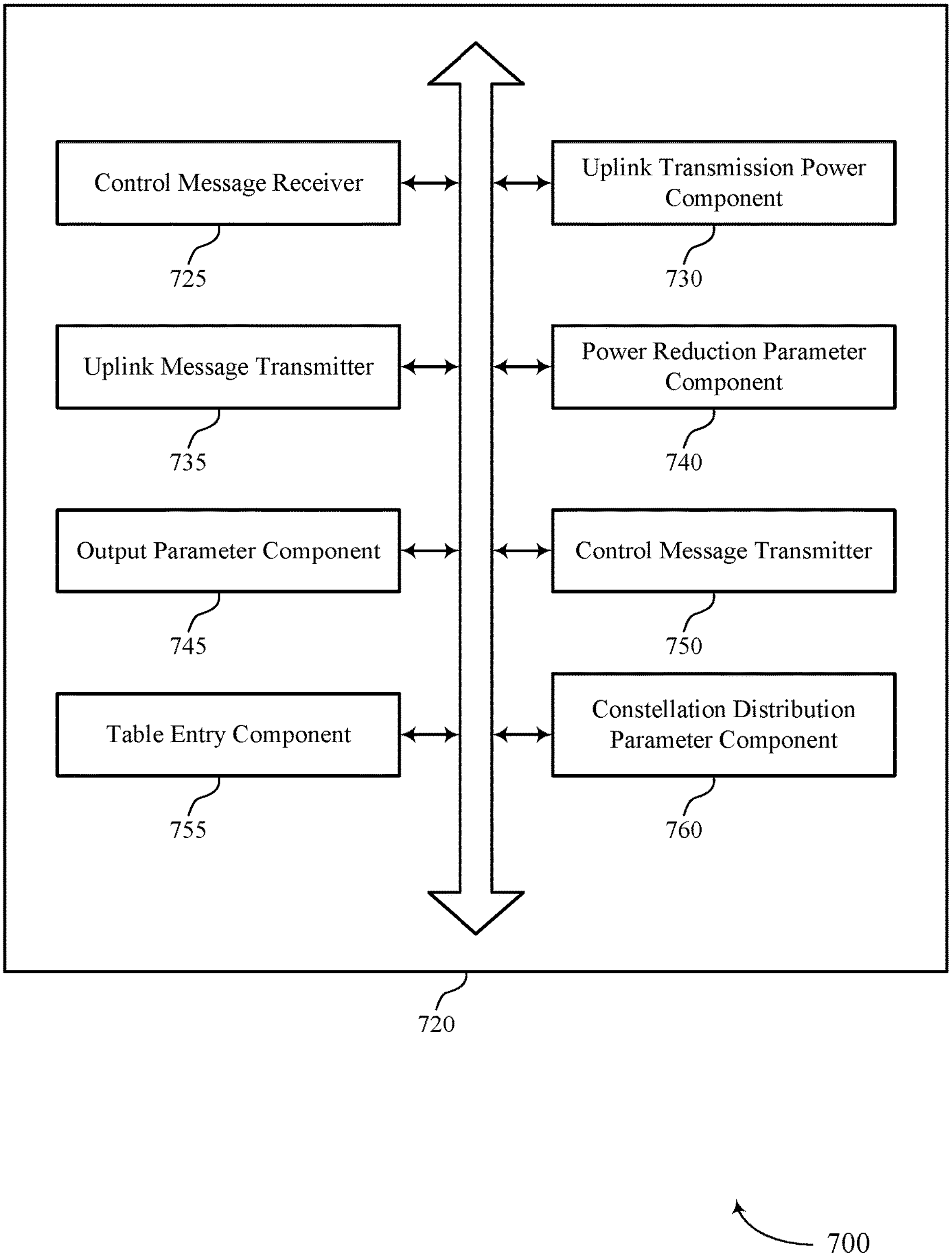
FIG. 7 shows a block diagram of a communications manager that supports power backoff techniques for modulation schemes in accordance with aspects of the present disclosure.

FIG. 7 shows a block diagram 700 of a communications manager 720 that supports power backoff techniques for modulation schemes in accordance with aspects of the present disclosure. The communications manager 720 may be an example of aspects of a communications manager 520, a communications manager 620, or both, as described herein. The communications manager 720, or various components thereof, may be an example of means for performing various aspects of power backoff techniques for modulation schemes as described herein. For example, the communications manager 720 may include a control message receiver 725, an uplink transmission power component 730, an uplink message transmitter 735, a power reduction parameter component 740, an output power parameter component 745, a control message transmitter 750, a table component 755, a constellation distribution parameter component 760, or any combination thereof. Each of these components may communicate, directly or indirectly, with one another (e.g., via one or more buses).

The communications manager 720 may support wireless communications at a UE in accordance with examples as disclosed herein. The control message receiver 725 may be configured as or otherwise support a means for receiving an indication of a constellation distribution parameter and a modulation scheme to be used by the UE for an uplink message on an uplink channel. The uplink transmission power component 730 may be configured as or otherwise support a means for determining an uplink transmission power based on the indicated constellation distribution parameter and the indicated modulation scheme. The uplink message transmitter 735 may be configured as or otherwise support a means for transmitting the uplink message using the indicated modulation scheme according to the determined uplink transmission power.

In some examples, to support determining the uplink transmission power, the power reduction parameter component 740 may be configured as or otherwise support a means for selecting a power reduction parameter based on the constellation distribution parameter. In some examples, to support determining the uplink transmission power, the output power parameter component 745 may be configured as or otherwise support a means for determining an output power parameter based on the power reduction parameter indicated by the constellation distribution parameter, where determining the uplink transmission power is based on the determined output power parameter.

In some examples, the control message transmitter 750 may be configured as or otherwise support a means for transmitting a report indicating a power headroom parameter and an output power parameter based on the constellation distribution parameter.

In some examples, the indicated modulation scheme includes a modulation type and a modulation waveform, and the power reduction parameter component 740 may be configured as or otherwise support a means for selecting a power reduction parameter corresponding to the constellation distribution parameter and a combination of the modulation type and the modulation waveform, where determining the uplink transmission power is based on the selected power reduction parameter.

In some examples, the power reduction parameter component 740 may be configured as or otherwise support a means for selecting, for the uplink message, a first power reduction parameter based on the indicated modulation scheme and a second power reduction parameter based on the constellation distribution parameter, where determining the uplink transmission power is based on the selected first power reduction parameter and the selected second power reduction parameter.

In some examples, the indicated modulation scheme includes a modulation type and a modulation waveform, and the power reduction parameter component 740 may be configured as or otherwise support a means for selecting, for the uplink message, the first power reduction parameter corresponding to the modulation type and the modulation waveform, and the second power reduction parameter corresponding to the constellation distribution parameter, the modulation type, and the modulation waveform, where determining the uplink transmission power is based on the selected first power reduction parameter and the selected second power reduction parameter.

In some examples, the indicated modulation scheme includes a modulation type and a modulation waveform, and the power reduction parameter component 740 may be configured as or otherwise support a means for selecting, for the uplink message, the first power reduction parameter corresponding to the modulation type and the modulation waveform, and the second power reduction parameter corresponding to the constellation distribution parameter and the modulation waveform, where determining the uplink transmission power is based on the selected first power reduction parameter and the selected second power reduction parameter.

In some examples, the control message receiver 725 may be configured as or otherwise support a means for receiving, from a base station, configuration signaling identifying a probabilistic constellation shaping scheme to be used by the UE to transmit the uplink message, where the constellation distribution parameter is associated with the probabilistic constellation shaping scheme.

In some examples, the probabilistic constellation shaping scheme includes a constant composition distribution matcher or a prefix-free code distribution matcher.

In some examples, to support receiving the indication of the constellation distribution parameter and the modulation scheme, the control message receiver 725 may be configured as or otherwise support a means for receiving control signaling including the indication of the constellation distribution parameter and the modulation scheme, the control signaling including a DCI message, an RRC message, a MAC-CE message, or any combination thereof.

In some examples, the control message receiver 725 may be configured as or otherwise support a means for receiving control signaling including the indication of the modulation scheme. In some examples, the table component 755 may be configured as or otherwise support a means for identifying an entry of a table preconfigured at the UE that corresponds to the modulation scheme. In some examples, the constellation distribution parameter component 760 may be configured as or otherwise support a means for determining a value of the constellation distribution parameter from a set of multiple values based on the identified entry.

In some examples, the control message transmitter 750 may be configured as or otherwise support a means for transmitting, to a base station, control signaling indicating a capability of the UE to determine uplink transmission powers for uplink messages according to constellation distribution parameters, where receiving the indication of the constellation distribution parameter and the modulation scheme is at least in part in response to the transmitted control signaling.

In some examples, the modulation scheme includes a modulation type, a modulation waveform, or a combination thereof.

In some examples, the modulation type includes a quadrature amplitude modulation type or a quadrature phase shift keying type. In some examples, the modulation waveform includes a direct Fourier transform spread orthogonal frequency division multiplexing waveform or a cyclic prefix orthogonal frequency division multiplexing waveform.

Figure 8:
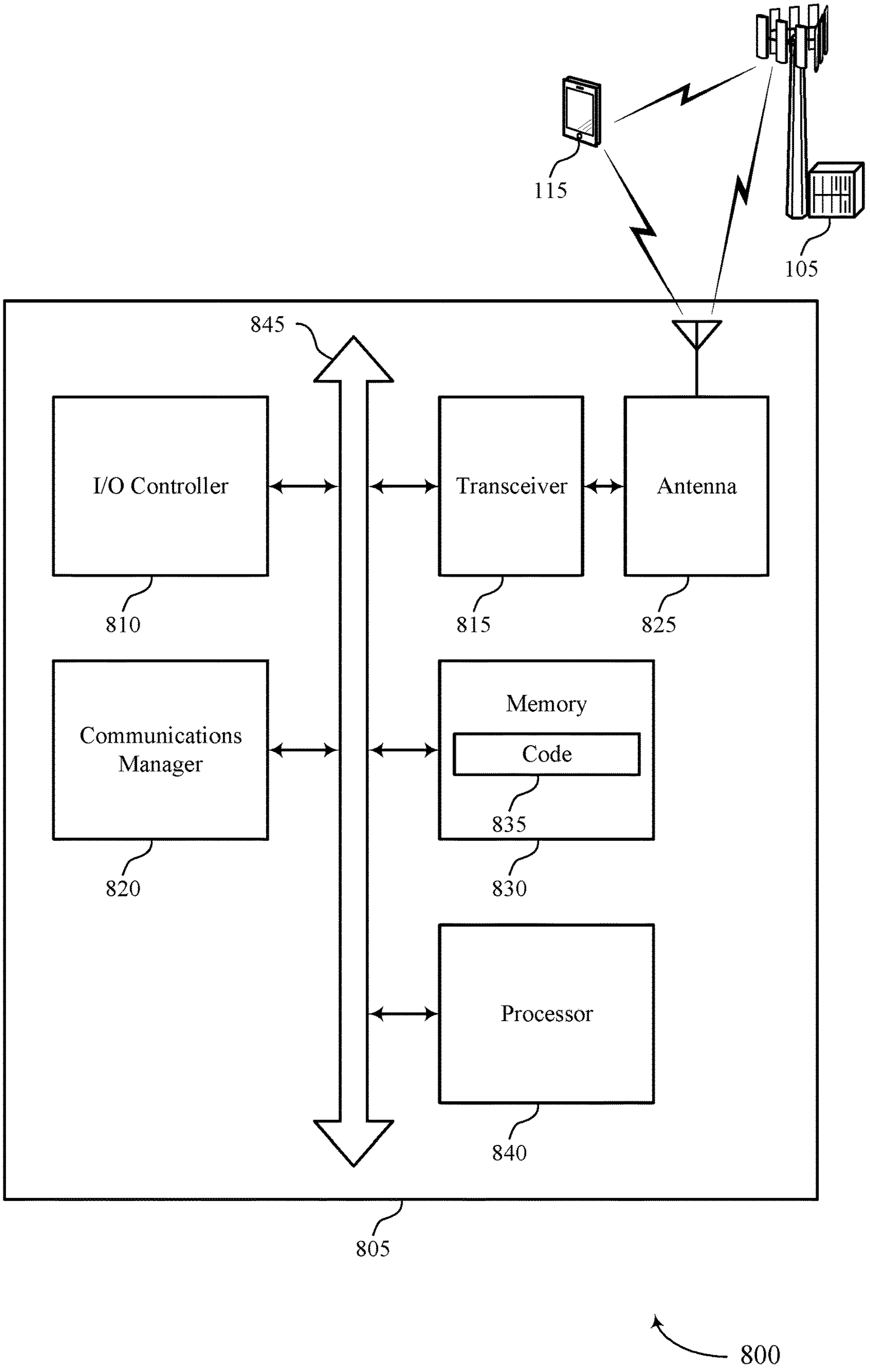
FIG. 8 shows a diagram of a system including a device that supports power backoff techniques for modulation schemes in accordance with aspects of the present disclosure.

FIG. 8 shows a diagram of a system 800 including a device 805 that supports power backoff techniques for modulation schemes in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting power backoff techniques for modulation schemes). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving an indication of a constellation distribution parameter and a modulation scheme to be used by the UE for an uplink message on an uplink channel. The communications manager 820 may be configured as or otherwise support a means for determining an uplink transmission power based on the indicated constellation distribution parameter and the indicated modulation scheme. The communications manager 820 may be configured as or otherwise support a means for transmitting the uplink message using the indicated modulation scheme according to the determined uplink transmission power.

By including or configuring the communications manager 820 in accordance with examples as described herein, the device 805 may support techniques for techniques for power backoff based on modulation schemes. For example, the device 805 may determine power parameters (e.g., power reduction parameters) based on a modulation scheme or PCS scheme as described herein, which may result in power savings, improved signal quality, or both at the device 805, among other advantages.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of power backoff techniques for modulation schemes as described herein, or the processor 840 and the memory 830 may be otherwise configured to perform or support such operations.

Figure 9:
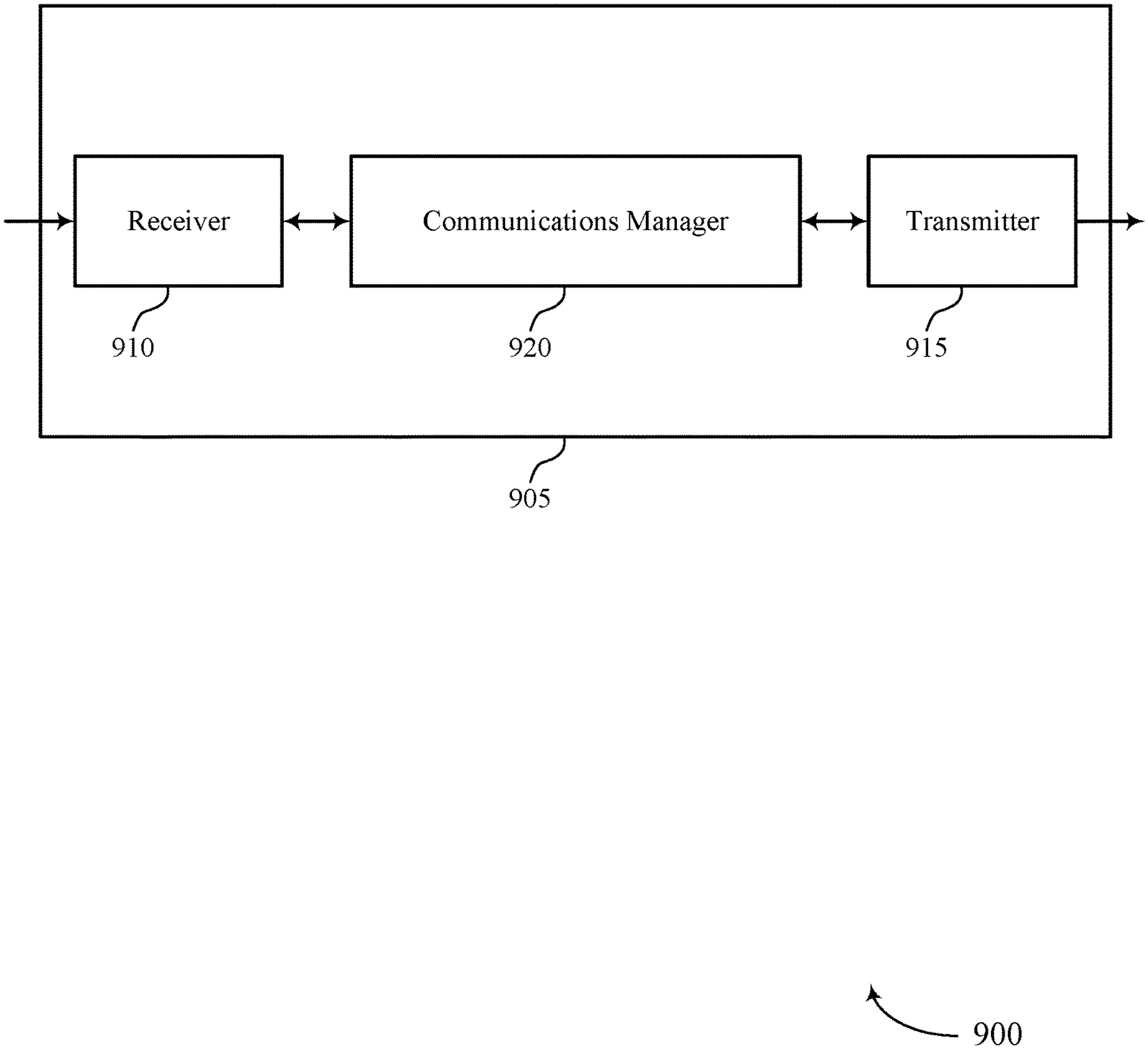
FIGS. 9 and 10 show block diagrams of devices that support power backoff techniques for modulation schemes in accordance with aspects of the present disclosure.

FIG. 9 shows a block diagram 900 of a device 905 that supports power backoff techniques for modulation schemes in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to power backoff techniques for modulation schemes). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to power backoff techniques for modulation schemes). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of power backoff techniques for modulation schemes as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for selecting, for a UE, a modulation scheme to be used by the UE for an uplink message to be transmitted on an uplink channel and a constellation distribution parameter associated with the modulation scheme. The communications manager 920 may be configured as or otherwise support a means for transmitting, to the UE, an indication of the selected modulation scheme and the selected constellation distribution parameter. The communications manager 920 may be configured as or otherwise support a means for receiving, from the UE, the uplink message on the uplink channel at least in part in response to the transmitted indication.

Figure 10:
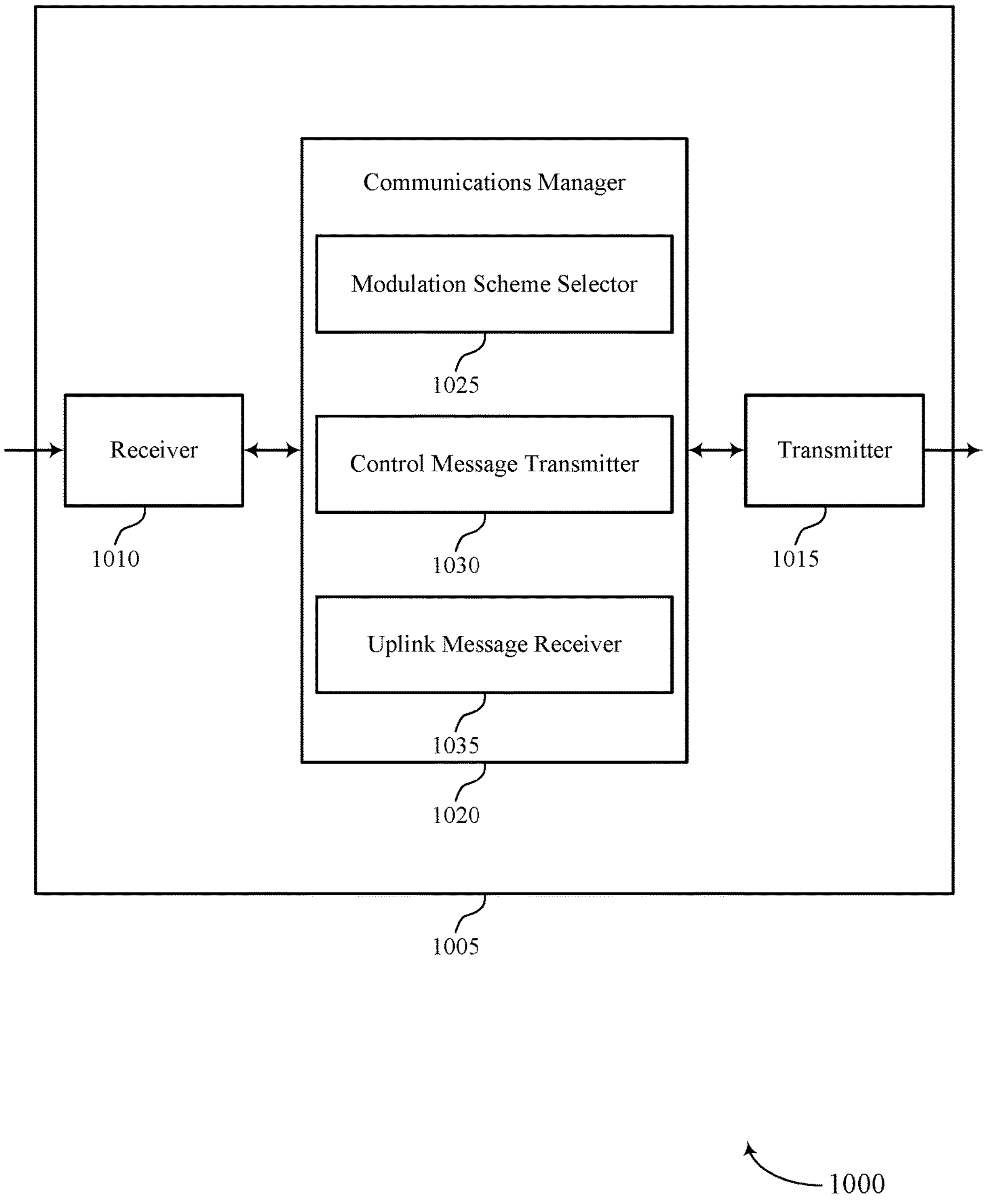

FIG. 10 shows a block diagram 1000 of a device 1005 that supports power backoff techniques for modulation schemes in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to power backoff techniques for modulation schemes). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to power backoff techniques for modulation schemes). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of power backoff techniques for modulation schemes as described herein. For example, the communications manager 1020 may include a modulation scheme selector 1025, a control message transmitter 1030, an uplink message receiver 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The modulation scheme selector 1025 may be configured as or otherwise support a means for selecting, for a UE, a modulation scheme to be used by the UE for an uplink message to be transmitted on an uplink channel and a constellation distribution parameter associated with the modulation scheme. The control message transmitter 1030 may be configured as or otherwise support a means for transmitting, to the UE, an indication of the selected modulation scheme and the selected constellation distribution parameter. The uplink message receiver 1035 may be configured as or otherwise support a means for receiving, from the UE, the uplink message on the uplink channel at least in part in response to the transmitted indication.

Figure 11:
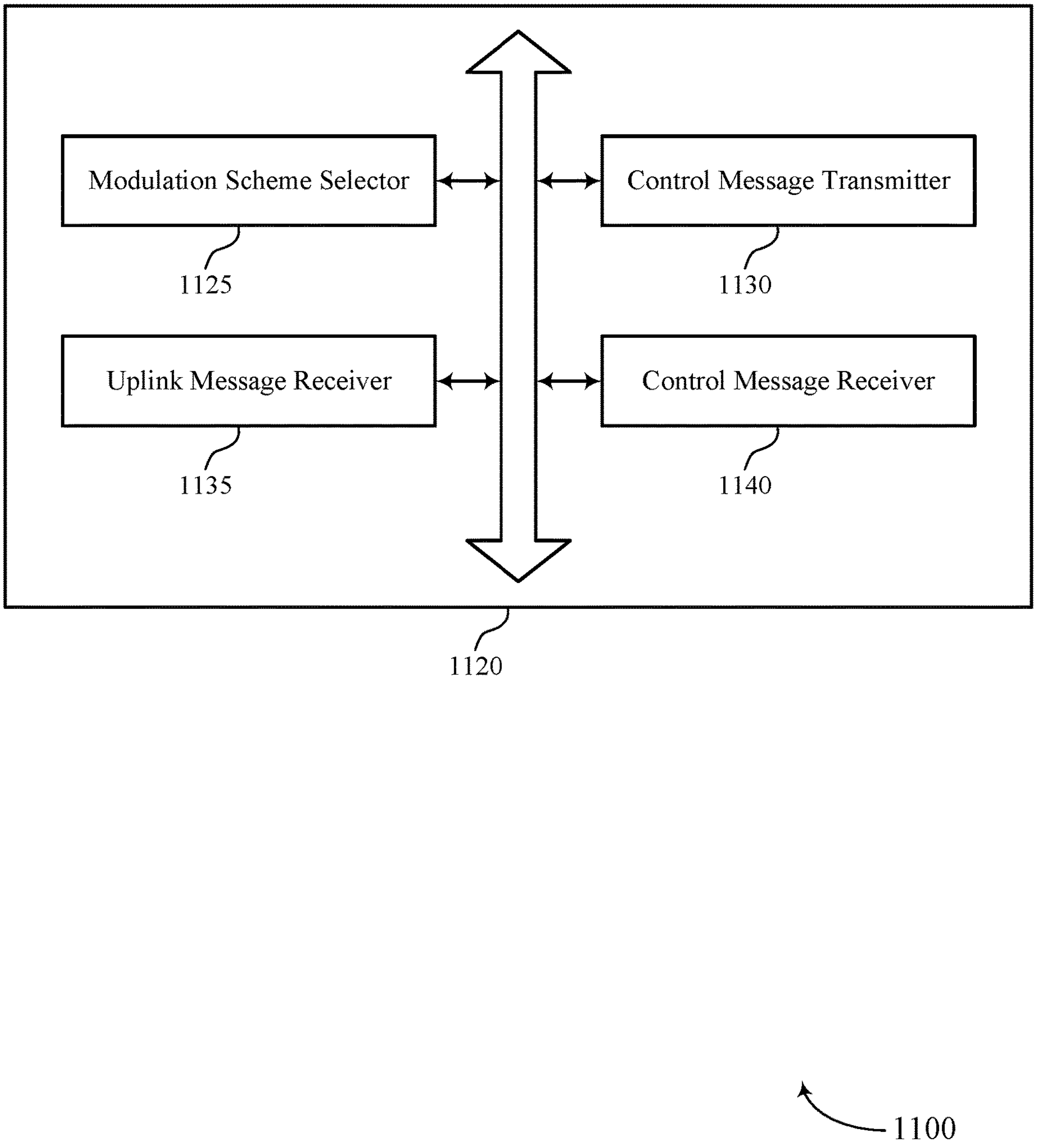
FIG. 11 shows a block diagram of a communications manager that supports power backoff techniques for modulation schemes in accordance with aspects of the present disclosure.

FIG. 11 shows a block diagram 1100 of a communications manager 1120 that supports power backoff techniques for modulation schemes in accordance with aspects of the present disclosure. The communications manager 1120 may be an example of aspects of a communications manager 920, a communications manager 1020, or both, as described herein. The communications manager 1120, or various components thereof, may be an example of means for performing various aspects of power backoff techniques for modulation schemes as described herein. For example, the communications manager 1120 may include a modulation scheme selector 1125, a control message transmitter 1130, an uplink message receiver 1135, a control message receiver 1140, or any combination thereof. Each of these components may communicate, directly or indirectly, with one another (e.g., via one or more buses).

The communications manager 1120 may support wireless communications at a base station in accordance with examples as disclosed herein. The modulation scheme selector 1125 may be configured as or otherwise support a means for selecting, for a UE, a modulation scheme to be used by the UE for an uplink message to be transmitted on an uplink channel and a constellation distribution parameter associated with the modulation scheme. The control message transmitter 1130 may be configured as or otherwise support a means for transmitting, to the UE, an indication of the selected modulation scheme and the selected constellation distribution parameter. The uplink message receiver 1135 may be configured as or otherwise support a means for receiving, from the UE, the uplink message on the uplink channel at least in part in response to the transmitted indication.

In some examples, the control message receiver 1140 may be configured as or otherwise support a means for receiving, from the UE, a report indicating a power headroom parameter and an output power parameter based on the constellation distribution parameter.

In some examples, the control message transmitter 1130 may be configured as or otherwise support a means for transmitting, to the UE, configuration signaling identifying a probabilistic constellation shaping scheme to be used by the UE to transmit the uplink message, where the constellation distribution parameter is associated with the probabilistic constellation shaping scheme.

In some examples, the probabilistic constellation shaping scheme includes a constant composition distribution matcher or a prefix-free code distribution matcher.

In some examples, to support transmitting the indication of the constellation distribution parameter and the modulation scheme, the control message transmitter 1130 may be configured as or otherwise support a means for transmitting control signaling including the indication of the constellation distribution parameter and the modulation scheme, the control signaling including a downlink control information message, a radio resource control message, a medium access control (MAC) control element (CE) message, or any combination thereof.

In some examples, the control message receiver 1140 may be configured as or otherwise support a means for receiving, from the UE, control signaling indicating a capability of the UE to determine uplink transmission powers for uplink messages according to constellation distribution parameters, where transmitting the indication of the constellation distribution parameter and the modulation scheme is at least in part in response to the received control signaling.

In some examples, the modulation scheme includes a modulation type, a modulation waveform, or a combination thereof. In some examples, the modulation type includes a quadrature amplitude modulation type or a quadrature phase shift keying type, and the modulation waveform includes a direct Fourier transform spread orthogonal frequency division multiplexing waveform or a cyclic prefix orthogonal frequency division multiplexing waveform.

Figure 12:
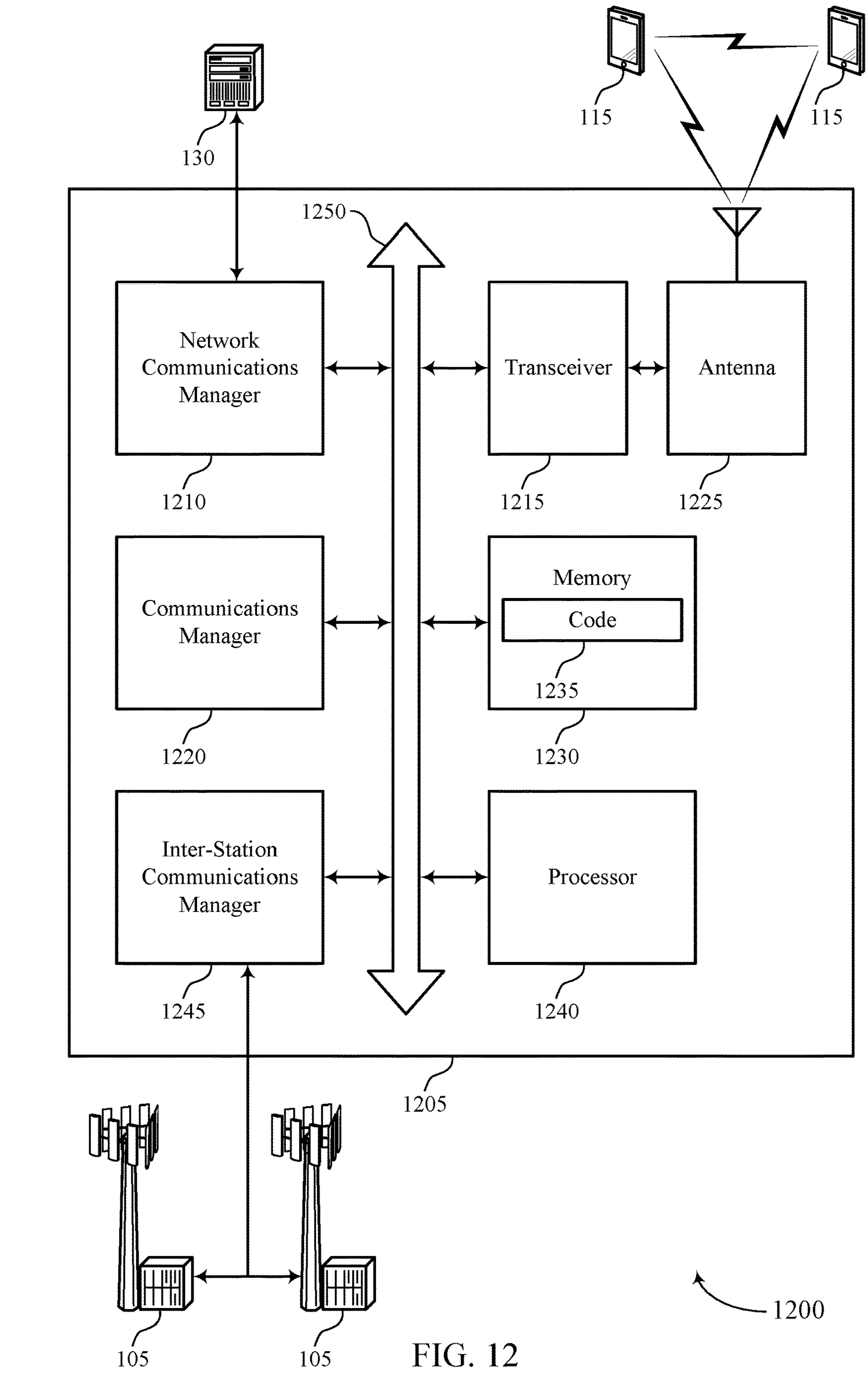
FIG. 12 shows a diagram of a system including a device that supports power backoff techniques for modulation schemes in accordance with aspects of the present disclosure.

FIG. 12 shows a diagram of a system 1200 including a device 1205 that supports power backoff techniques for modulation schemes in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting power backoff techniques for modulation schemes). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for selecting, for a UE, a modulation scheme to be used by the UE for an uplink message to be transmitted on an uplink channel and a constellation distribution parameter associated with the modulation scheme. The communications manager 1220 may be configured as or otherwise support a means for transmitting, to the UE, an indication of the selected modulation scheme and the selected constellation distribution parameter. The communications manager 1220 may be configured as or otherwise support a means for receiving, from the UE, the uplink message on the uplink channel at least in part in response to the transmitted indication.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of power backoff techniques for modulation schemes as described herein, or the processor 1240 and the memory 1230 may be otherwise configured to perform or support such operations.

Figure 13:
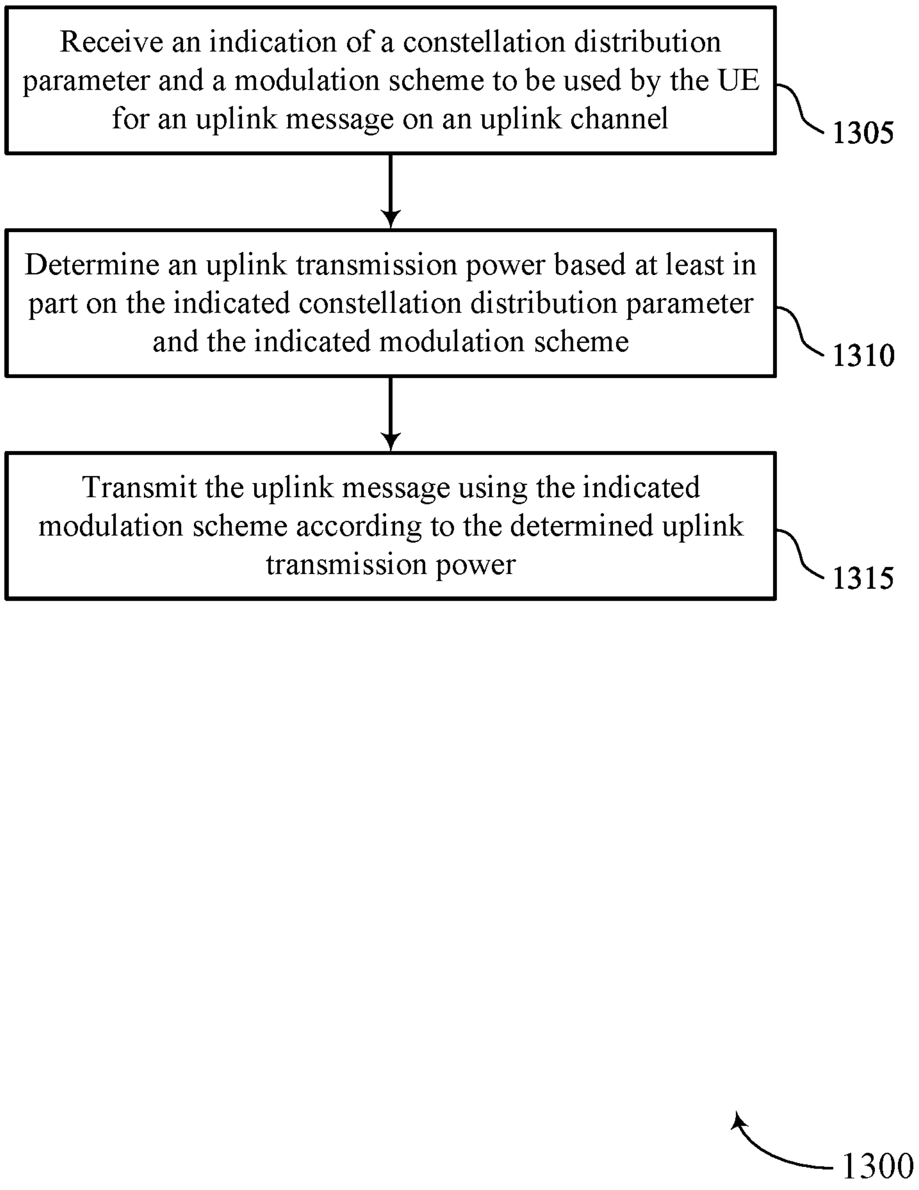
FIGS. 13 through 15 show flowcharts illustrating methods that support power backoff techniques for modulation schemes in accordance with aspects of the present disclosure.

FIG. 13 shows a flowchart illustrating a method 1300 that supports power backoff techniques for modulation schemes in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving an indication of a constellation distribution parameter and a modulation scheme to be used by the UE for an uplink message on an uplink channel. The operations of 1305 may be performed in accordance with examples as disclosed herein. In some examples, aspects of the operations of 1305 may be performed by a control message receiver 725 as described with reference to FIG. 7.

At 1310, the method may include determining an uplink transmission power based on the indicated constellation distribution parameter and the indicated modulation scheme. The operations of 1310 may be performed in accordance with examples as disclosed herein. In some examples, aspects of the operations of 1310 may be performed by an uplink transmission power component 730 as described with reference to FIG. 7.

At 1315, the method may include transmitting the uplink message using the indicated modulation scheme according to the determined uplink transmission power. The operations of 1315 may be performed in accordance with examples as disclosed herein. In some examples, aspects of the operations of 1315 may be performed by an uplink message transmitter 735 as described with reference to FIG. 7.

Figure 14:
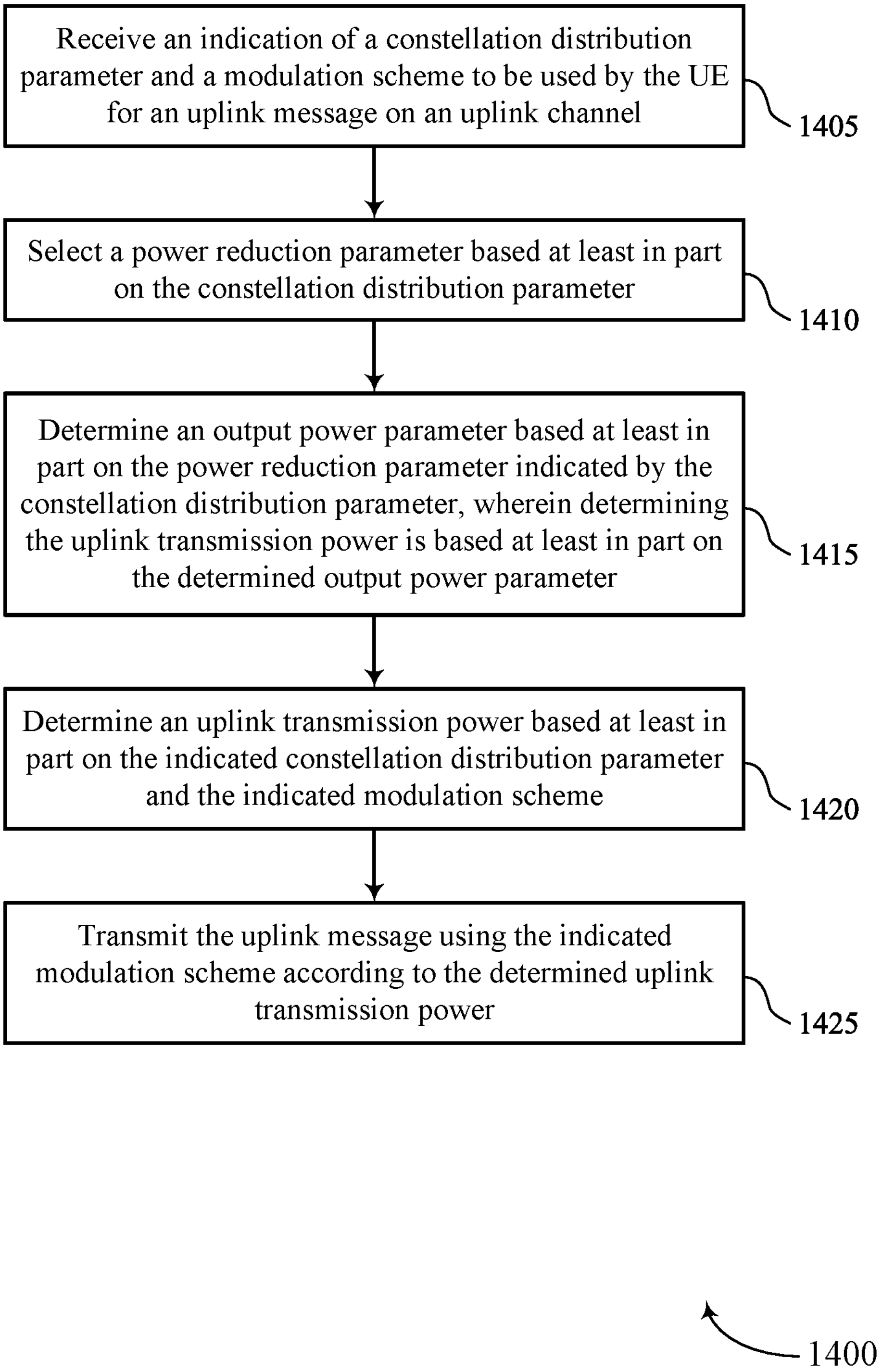

FIG. 14 shows a flowchart illustrating a method 1400 that supports power backoff techniques for modulation schemes in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving an indication of a constellation distribution parameter and a modulation scheme to be used by the UE for an uplink message on an uplink channel. The operations of 1405 may be performed in accordance with examples as disclosed herein. In some examples, aspects of the operations of 1405 may be performed by a control message receiver 725 as described with reference to FIG. 7.

At 1410, the method may include selecting a power reduction parameter based on the constellation distribution parameter. The operations of 1410 may be performed in accordance with examples as disclosed herein. In some examples, aspects of the operations of 1410 may be performed by a power reduction parameter component 740 as described with reference to FIG. 7.

At 1415, the method may include determining an output power parameter based on the power reduction parameter indicated by the constellation distribution parameter, where determining the uplink transmission power is based on the determined output power parameter. The operations of 1415 may be performed in accordance with examples as disclosed herein. In some examples, aspects of the operations of 1415 may be performed by an output power parameter component 745 as described with reference to FIG. 7.

At 1420, the method may include determining an uplink transmission power based on the indicated constellation distribution parameter and the indicated modulation scheme. The operations of 1420 may be performed in accordance with examples as disclosed herein. In some examples, aspects of the operations of 1420 may be performed by an uplink transmission power component 730 as described with reference to FIG. 7.

At 1425, the method may include transmitting the uplink message using the indicated modulation scheme according to the determined uplink transmission power. The operations of 1425 may be performed in accordance with examples as disclosed herein. In some examples, aspects of the operations of 1425 may be performed by an uplink message transmitter 735 as described with reference to FIG. 7.

Figure 15:
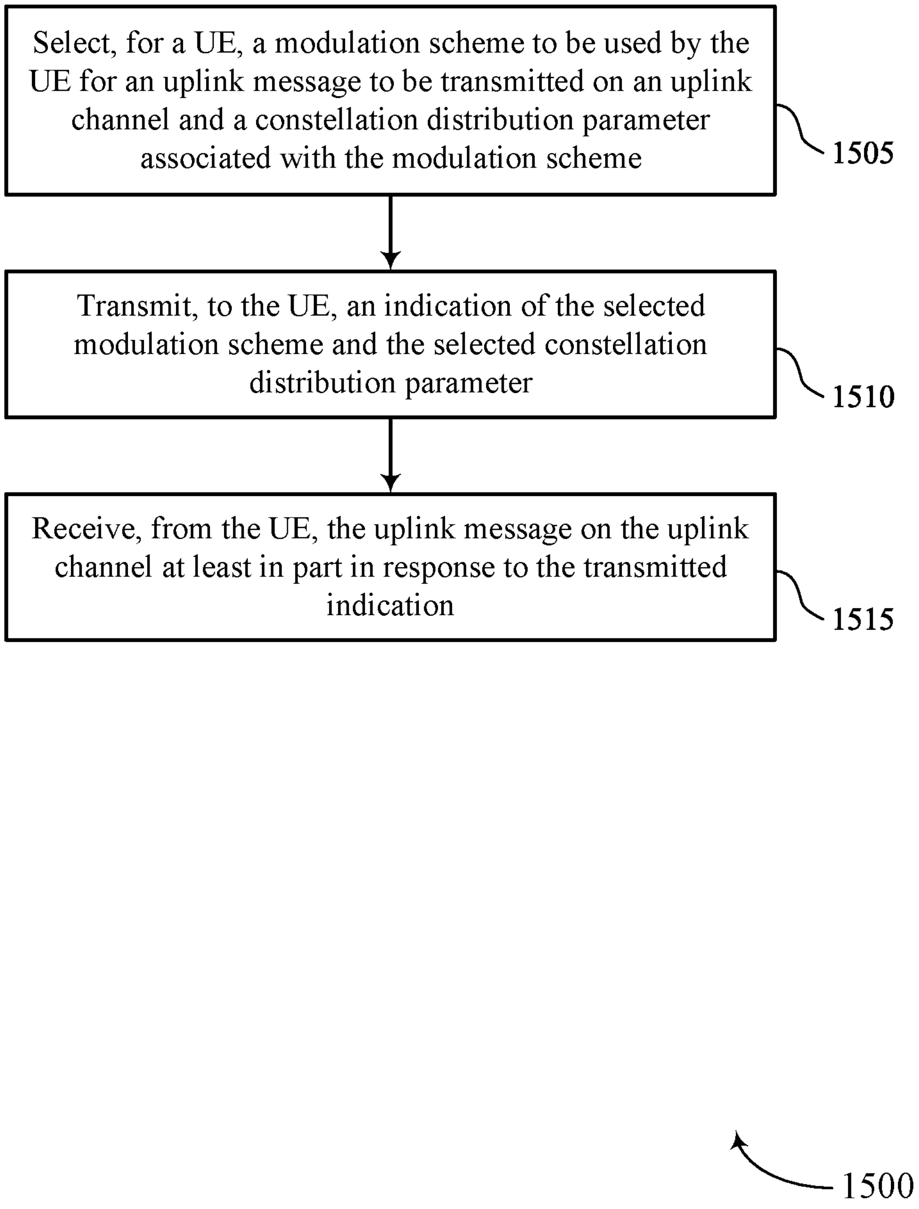

FIG. 15 shows a flowchart illustrating a method 1500 that supports power backoff techniques for modulation schemes in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include selecting, for a UE, a modulation scheme to be used by the UE for an uplink message to be transmitted on an uplink channel and a constellation distribution parameter associated with the modulation scheme. The operations of 1505 may be performed in accordance with examples as disclosed herein. In some examples, aspects of the operations of 1505 may be performed by a modulation scheme selector 1125 as described with reference to FIG. 11.

At 1510, the method may include transmitting, to the UE, an indication of the selected modulation scheme and the selected constellation distribution parameter. The operations of 1510 may be performed in accordance with examples as disclosed herein. In some examples, aspects of the operations of 1510 may be performed by a control message transmitter 1130 as described with reference to FIG. 11.

At 1515, the method may include receiving, from the UE, the uplink message on the uplink channel at least in part in response to the transmitted indication. The operations of 1515 may be performed in accordance with examples as disclosed herein. In some examples, aspects of the operations of 1515 may be performed by an uplink message receiver 1135 as described with reference to FIG. 11.

The following provides an overview of aspects of the present disclosure:

Aspect 1: A method for wireless communications at a UE, comprising: receiving an indication of a constellation distribution parameter and a modulation scheme to be used by the UE for an uplink message on an uplink channel; determining an uplink transmission power based at least in part on the indicated constellation distribution parameter and the indicated modulation scheme; and transmitting the uplink message using the indicated modulation scheme according to the determined uplink transmission power.

Aspect 2: The method of aspect 1, wherein determining the uplink transmission power comprises: selecting a power reduction parameter based at least in part on the constellation distribution parameter; and determining an output power parameter based at least in part on the power reduction parameter indicated by the constellation distribution parameter, wherein determining the uplink transmission power is based at least in part on the determined output power parameter.

Aspect 3: The method of any of aspects 1 through 2, further comprising: transmitting a report indicating a power headroom parameter and an output power parameter based at least in part on the constellation distribution parameter.

Aspect 4: The method of any of aspects 1 through 3, wherein the indicated modulation scheme comprises a modulation type and a modulation waveform, the method further comprising: selecting a power reduction parameter corresponding to the constellation distribution parameter and a combination of the modulation type and the modulation waveform, wherein determining the uplink transmission power is based at least in part on the selected power reduction parameter.

Aspect 5: The method of any of aspects 1 through 4, further comprising: selecting, for the uplink message, a first power reduction parameter based at least in part on the indicated modulation scheme and a second power reduction parameter based at least in part on the constellation distribution parameter, wherein determining the uplink transmission power is based at least in part on the selected first power reduction parameter and the selected second power reduction parameter.

Aspect 6: The method of aspect 5, wherein the indicated modulation scheme comprises a modulation type and a modulation waveform, the method further comprising: selecting, for the uplink message, the first power reduction parameter corresponding to the modulation type and the modulation waveform, and the second power reduction parameter corresponding to the constellation distribution parameter, the modulation type, and the modulation waveform, wherein determining the uplink transmission power is based at least in part on the selected first power reduction parameter and the selected second power reduction parameter.

Aspect 7: The method of any of aspects 5 through 6, wherein the indicated modulation scheme comprises a modulation type and a modulation waveform, the method further comprising: selecting, for the uplink message, the first power reduction parameter corresponding to the modulation type and the modulation waveform, and the second power reduction parameter corresponding to the constellation distribution parameter and the modulation waveform, wherein determining the uplink transmission power is based at least in part on the selected first power reduction parameter and the selected second power reduction parameter.

Aspect 8: The method of any of aspects 1 through 7, further comprising: receiving, from a base station, configuration signaling identifying a probabilistic constellation shaping scheme to be used by the UE to transmit the uplink message, wherein the constellation distribution parameter is associated with the probabilistic constellation shaping scheme.

Aspect 9: The method of aspect 8, wherein the probabilistic constellation shaping scheme comprises a constant composition distribution matcher or a prefix-free code distribution matcher.

Aspect 10: The method of any of aspects 1 through 9, wherein receiving the indication of the constellation distribution parameter and the modulation scheme comprises: receiving control signaling comprising the indication of the constellation distribution parameter and the modulation scheme, the control signaling comprising a downlink control information message, a radio resource control message, a medium access control (MAC) control element message (CE), or any combination thereof.

Aspect 11: The method of any of aspects 1 through 10, further comprising: receiving control signaling comprising the indication of the modulation scheme; identifying an entry of a table preconfigured at the UE that corresponds to the modulation scheme; and determining a value of the constellation distribution parameter from a plurality of values based at least in part on the identified entry.

Aspect 12: The method of any of aspects 1 through 11, further comprising: transmitting, to a base station, control signaling indicating a capability of the UE to determine uplink transmission powers for uplink messages according to constellation distribution parameters, wherein receiving the indication of the constellation distribution parameter and the modulation scheme is at least in part in response to the transmitted control signaling.

Aspect 13: The method of any of aspects 1 through 12, wherein the modulation scheme comprises a modulation type, a modulation waveform, or a combination thereof.

Aspect 14: The method of aspect 13, wherein the modulation type comprises a quadrature amplitude modulation type or a quadrature phase shift keying type; and the modulation waveform comprises a direct Fourier transform spread orthogonal frequency division multiplexing waveform or a cyclic prefix orthogonal frequency division multiplexing waveform.

Aspect 15: A method for wireless communications at a base station, comprising: selecting, for a UE, a modulation scheme to be used by the UE for an uplink message to be transmitted on an uplink channel and a constellation distribution parameter associated with the modulation scheme; transmitting, to the UE, an indication of the selected modulation scheme and the selected constellation distribution parameter; and receiving, from the UE, the uplink message on the uplink channel at least in part in response to the transmitted indication.

Aspect 16: The method of aspect 15, further comprising: receiving, from the UE, a report indicating a power headroom parameter and an output power parameter based at least in part on the constellation distribution parameter.

Aspect 17: The method of any of aspects 15 through 16, further comprising: transmitting, to the UE, configuration signaling identifying a probabilistic constellation shaping scheme to be used by the UE to transmit the uplink message, wherein the constellation distribution parameter is associated with the probabilistic constellation shaping scheme.

Aspect 18: The method of aspect 17, wherein the probabilistic constellation shaping scheme comprises a constant composition distribution matcher or a prefix-free code distribution matcher.

Aspect 19: The method of any of aspects 15 through 18, wherein transmitting the indication of the constellation distribution parameter and the modulation scheme comprises: transmitting control signaling comprising the indication of the constellation distribution parameter and the modulation scheme, the control signaling comprising a downlink control information message, a radio resource control message, a medium access control (MAC) control element (CE) message, or any combination thereof.

Aspect 20: The method of any of aspects 15 through 19, further comprising: receiving, from the UE, control signaling indicating a capability of the UE to determine uplink transmission powers for uplink messages according to constellation distribution parameters, wherein transmitting the indication of the constellation distribution parameter and the modulation scheme is at least in part in response to the received control signaling.

Aspect 21: The method of any of aspects 15 through 20, wherein. the modulation scheme comprises a modulation type, a modulation waveform, or a combination thereof, and the modulation type comprises a quadrature amplitude modulation type or a quadrature phase shift keying type, and the modulation waveform comprises a direct Fourier transform spread orthogonal frequency division multiplexing waveform or a cyclic prefix orthogonal frequency division multiplexing waveform Aspect 22: An apparatus for wireless communications at a UE, comprising a processor; memory coupled with the processor; and instructions stored in the memory and executable by the processor to cause the apparatus to perform a method of any of aspects 1 through 14.

Aspect 23: An apparatus for wireless communications at a UE, comprising at least one means for performing a method of any of aspects 1 through 14.

Aspect 24: A non-transitory computer-readable medium storing code for wireless communications at a UE, the code comprising instructions executable by a processor to perform a method of any of aspects 1 through 14.

Aspect 25: An apparatus for wireless communications at a base station, comprising a processor; memory coupled with the processor; and instructions stored in the memory and executable by the processor to cause the apparatus to perform a method of any of aspects 15 through 21.

Aspect 26: An apparatus for wireless communications at a base station, comprising at least one means for performing a method of any of aspects 15 through 21.

Aspect 27: A non-transitory computer-readable medium storing code for wireless communications at a base station, the code comprising instructions executable by a processor to perform a method of any of aspects 15 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more processors; and one or more memories coupled with the one or more processors, wherein the one or more processors are configured to:

receive an indication of a constellation distribution parameter and a modulation scheme to be used by the UE for an uplink message on an uplink channel;

select a power reduction parameter based at least in part on the constellation distribution parameter;

determine an uplink transmission power based at least in part on the power reduction parameter indicated by the constellation distribution parameter and the indicated modulation scheme; and transmit the uplink message using the indicated modulation scheme according to the determined uplink transmission power.

2. The UE of claim 1, wherein, to determine the uplink transmission power, the one or more processors are configured to:

determine an output power parameter based at least in part on the power reduction parameter indicated by the constellation distribution parameter, wherein determination of the uplink transmission power is based at least in part on the determined output power parameter.

3. The UE of claim 1, wherein the one or more processors are configured to:

transmit a report indicating a power headroom parameter and an output power parameter based at least in part on the constellation distribution parameter.

4. The UE of claim 1, wherein the indicated modulation scheme comprises a modulation type and a modulation waveform, the power reduction parameter corresponds to the constellation distribution parameter and a combination of the modulation type and the modulation waveform, and determination of the uplink transmission power is based at least in part on the selected power reduction parameter.

5. The UE of claim 1, wherein, to select the power reduction parameter, the one or more processors are configured to:

select, for the uplink message, a first power reduction parameter based at least in part on the indicated modulation scheme and a second power reduction parameter based at least in part on the constellation distribution parameter, wherein determination of the uplink transmission power is based at least in part on the selected first power reduction parameter and the selected second power reduction parameter.

6. The UE of claim 5, wherein the indicated modulation scheme comprises a modulation type and a modulation waveform, and wherein the one or more processors are configured to:

select, for the uplink message, the first power reduction parameter corresponding to the modulation type and the modulation waveform, and the second power reduction parameter corresponding to the constellation distribution parameter, the modulation type, and the modulation waveform, wherein determination of the uplink transmission power is based at least in part on the selected first power reduction parameter and the selected second power reduction parameter.

7. The UE of claim 5, wherein the indicated modulation scheme comprises a modulation type and a modulation waveform, and wherein the one or more processors are configured to:

select, for the uplink message, the first power reduction parameter corresponding to the modulation type and the modulation waveform, and the second power reduction parameter corresponding to the constellation distribution parameter and the modulation waveform, wherein determination of the uplink transmission power is based at least in part on the selected first power reduction parameter and the selected second power reduction parameter.

8. The UE of claim 1, wherein the one or more processors are configured to:

receive, from a network device, configuration signaling identifying a probabilistic constellation shaping scheme to be used by the UE to transmit the uplink message, wherein the constellation distribution parameter is associated with the probabilistic constellation shaping scheme.

9. The UE of claim 8, wherein the probabilistic constellation shaping scheme comprises a constant composition distribution matcher or a prefix-free code distribution matcher.

10. The UE of claim 1, wherein, to receive the indication of the constellation distribution parameter and the modulation scheme, the one or more processors are configured to:

receive control signaling comprising the indication of the constellation distribution parameter and the modulation scheme, the control signaling comprising a downlink control information message, a radio resource control message, a medium access control (MAC) control element (CE) message, or any combination thereof.

11. The UE of claim 1, wherein the one or more processors are configured to:

receive control signaling comprising the indication of the modulation scheme;

identify an entry of a table preconfigured at the UE that corresponds to the modulation scheme; and determine a value of the constellation distribution parameter from a plurality of values based at least in part on the identified entry.

12. The UE of claim 1, wherein the one or more processors are configured to:

transmit, to a network device, control signaling indicating a capability of the UE to determine uplink transmission powers for uplink messages according to constellation distribution parameters, wherein reception of the indication of the constellation distribution parameter and the modulation scheme is at least in part in response to the transmitted control signaling.

13. The UE of claim 1, wherein the modulation scheme comprises a modulation type, a modulation waveform, or a combination thereof.

14. The UE of claim 13, wherein:

the modulation type comprises a quadrature amplitude modulation type or a quadrature phase shift keying type; and the modulation waveform comprises a direct Fourier transform spread orthogonal frequency division multiplexing waveform or a cyclic prefix orthogonal frequency division multiplexing waveform.

15. A network device, comprising:

one or more processors; and one or more memories coupled with the one or more processors, wherein the one or more processors are configured to:

select, for a user equipment (UE), a modulation scheme to be used by the UE for an uplink message to be transmitted on an uplink channel and a constellation distribution parameter associated with the modulation scheme;

transmit, to the UE, an indication of the selected modulation scheme and the selected constellation distribution parameter; and receive, from the UE, the uplink message on the uplink channel based at least in part on the transmitted indication in accordance with a power reduction parameter that corresponds to the constellation distribution parameter.

16. The network device of claim 15, wherein the one or more processors are configured to:

receive, from the UE, a report indicating a power headroom parameter and an output power parameter based at least in part on the constellation distribution parameter.

17. The network device of claim 15, wherein the one or more processors are configured to:

transmit, to the UE, configuration signaling identifying a probabilistic constellation shaping scheme to be used by the UE to transmit the uplink message, wherein the constellation distribution parameter is associated with the probabilistic constellation shaping scheme.

18. The network device of claim 17, wherein the probabilistic constellation shaping scheme comprises a constant composition distribution matcher or a prefix-free code distribution matcher.

19. The network device of claim 15, wherein, to transmit the indication of the constellation distribution parameter and the modulation scheme, the one or more processors are configured to:

transmit control signaling comprising the indication of the constellation distribution parameter and the modulation scheme, the control signaling comprising a downlink control information message, a radio resource control message, a medium access control (MAC) control element (CE) message, or any combination thereof.

20. The network device of claim 15, wherein the one or more processors are configured to:

receive, from the UE, control signaling indicating a capability of the UE to determine uplink transmission powers for uplink messages according to constellation distribution parameters, wherein transmission of the indication of the constellation distribution parameter and the modulation scheme is at least in part in response to the received control signaling.

21. The network device of claim 15, wherein:

the modulation scheme comprises a modulation type, a modulation waveform, or a combination thereof, and the modulation type comprises a quadrature amplitude modulation type or a quadrature phase shift keying type, and the modulation waveform comprises a direct Fourier transform spread orthogonal frequency division multiplexing waveform or a cyclic prefix orthogonal frequency division multiplexing waveform.

22. A method of wireless communications performed by a user equipment (UE), comprising:

receiving an indication of a constellation distribution parameter and a modulation scheme to be used by the UE for an uplink message on an uplink channel;

selecting a power reduction parameter based at least in part on the constellation distribution parameter;

determining an uplink transmission power based at least in part on the power reduction parameter indicated by the constellation distribution parameter and the indicated modulation scheme; and determining the uplink message using the indicated modulation scheme according to the determined uplink transmission power.

23. The method of claim 22, wherein determining the uplink transmission power comprises:

determining an output power parameter based at least in part on the power reduction parameter indicated by the constellation distribution parameter, wherein determining the uplink transmission power is based at least in part on the determined output power parameter.

24. The method of claim 22, further comprising:

transmitting a report indicating a power headroom parameter and an output power parameter based at least in part on the constellation distribution parameter.

25. The method of claim 22, wherein the indicated modulation scheme comprises a modulation type and a modulation waveform, the power reduction parameter corresponding to the constellation distribution parameter and a combination of the modulation type and the modulation waveform, and determining the uplink transmission power is based at least in part on the selected power reduction parameter.

26. The method of claim 22, wherein selecting the power reduction parameter comprises:

selecting, for the uplink message, a first power reduction parameter based at least in part on the indicated modulation scheme and a second power reduction parameter based at least in part on the constellation distribution parameter, wherein determining the uplink transmission power is based at least in part on the selected first power reduction parameter and the selected second power reduction parameter.

27. A method of wireless communications performed by a network device, comprising:

selecting, for a user equipment (UE), a modulation scheme to be used by the UE for an uplink message to be transmitted on an uplink channel and a constellation distribution parameter associated with the modulation scheme;

transmitting, to the UE, an indication of the selected modulation scheme and the selected constellation distribution parameter; and receive, from the UE, the uplink message on the uplink channel based at least in part on the transmitted indication in accordance with a power reduction parameter that corresponds to the constellation distribution parameter.

28. The method of claim 27, further comprising:

receiving, from the UE, a report indicating a power headroom parameter and an output power parameter based at least in part on the constellation distribution parameter.

29. The method of claim 27, further comprising:

transmitting, to the UE, configuration signaling identifying a probabilistic constellation shaping scheme to be used by the UE to transmit the uplink message, wherein the constellation distribution parameter is associated with the probabilistic constellation shaping scheme.

30. The method of claim 27, wherein transmitting the indication of the constellation distribution parameter and the modulation scheme further comprises:

transmitting control signaling comprising the indication of the constellation distribution parameter and the modulation scheme, the control signaling comprising a downlink control information message, a radio resource control message, a medium access control (MAC) control element (CE) message, or any combination thereof.

* * * * *